US010672053B1

(12) United States Patent
Clemmens

(10) Patent No.: US 10,672,053 B1
(45) Date of Patent: Jun. 2, 2020

(54) SYSTEMS, MANUFACTURES, AND METHODS FOR COMPARATIVE BID ANALYSIS AND PURCHASE ORDER PREPARATION

(71) Applicant: Michael J. Clemmens, Charleston, SC (US)

(72) Inventor: Michael J. Clemmens, Charleston, SC (US)

(73) Assignee: Michael J. Clemmens, Clarleston, SC (US)

( * ) Notice: Subject to any disclaimer, the term of this patent is extended or adjusted under 35 U.S.C. 154(b) by 0 days.

(21) Appl. No.: 14/457,475

(22) Filed: Aug. 12, 2014

Related U.S. Application Data

(60) Provisional application No. 61/867,401, filed on Aug. 19, 2013.

(51) Int. Cl.
*G06Q 30/00* (2012.01)
*G06Q 30/06* (2012.01)

(52) U.S. Cl.
CPC ......... *G06Q 30/0629* (2013.01); *G06Q 30/06* (2013.01); *G06Q 30/0611* (2013.01); *G06Q 30/0633* (2013.01); *G06Q 30/0635* (2013.01); *G06Q 30/0637* (2013.01); *G06Q 30/0641* (2013.01)

(58) Field of Classification Search
CPC ................ G06Q 30/0601–0645; G06Q 30/08
USPC .............................................. 705/26.1–27.2
See application file for complete search history.

(56) References Cited

U.S. PATENT DOCUMENTS

| 5,842,178 | A  | * | 11/1998 | Giovannoli | .................. 705/26.4 |
| 7,107,226 | B1 | * | 9/2006  | Cassidy et al. | .............. 705/26.8 |
| 7,788,143 | B2 |   | 8/2010  | Gindlesperger | |
| 7,970,662 | B2 |   | 6/2011  | Calonge | |
| 8,027,892 | B2 |   | 9/2011  | Baumann et al. | |

(Continued)

FOREIGN PATENT DOCUMENTS

| JP | 20100176446    | 8/2010  |
| JP | 2011227848 A   | 11/2011 |

OTHER PUBLICATIONS

Crunchtime, Inventory Management, 2013, accessed at [https://web.archive.org/web/20130608125641/https://www.crunchtime.com/solutions/inventory-management/](Year: 2013).*

*Primary Examiner* — Jeffrey A. Smith
*Assistant Examiner* — Lindsey B Smith
(74) *Attorney, Agent, or Firm* — Eversheds Sutherland (US) LLP

(57) ABSTRACT

Embodiments include systems and methods for providing comparative bid analysis and purchase order preparation. In one embodiment, a method can include receiving price data from one or more vendors; based at least in part on the received price data, identifying similar items from the two or more vendors; comparing the identified similar items to determine a lowest price; generating one or more indications for output to a user to verify price data; based at least in part on the received price data, generating a proposed purchase order selecting the lowest price for some or all of the identified items; providing the proposed purchase order for the user to select one or more items; after user approval, generating a purchase order for the two or more vendors utilizing some or all of the user-selected items in the proposed purchase order; and transmitting the purchase order to the two or more vendors.

17 Claims, 31 Drawing Sheets

(56) References Cited

U.S. PATENT DOCUMENTS

| | | | |
|---|---|---|---|
| 8,407,100 B2 | 3/2013 | Miller | |
| 8,407,101 B2 | 3/2013 | Lutnick | |
| 8,521,613 B2 | 8/2013 | Erbey et al. | |
| 8,694,429 B1 * | 4/2014 | Ballaro | G06Q 30/0601 705/40 |
| 2002/0065736 A1 * | 5/2002 | Willner et al. | 705/26 |
| 2003/0014326 A1 | 1/2003 | Ben-Meir et al. | |
| 2003/0088449 A1 | 5/2003 | Menninger | |
| 2004/0078277 A1 | 4/2004 | Gindlesperger | |
| 2005/0108116 A1 | 5/2005 | Dobson et al. | |
| 2005/0182147 A1 | 8/2005 | Huang et al. | |
| 2007/0233510 A1 | 10/2007 | Howes | |
| 2008/0015973 A1 | 1/2008 | Erisman | |
| 2008/0016007 A1 | 1/2008 | Erisman | |
| 2008/0306853 A1 | 12/2008 | McLemore et al. | |
| 2009/0164338 A1 * | 6/2009 | Rothman | 705/27 |
| 2010/0312672 A1 | 12/2010 | Lella et al. | |
| 2011/0010271 A1 | 1/2011 | Black et al. | |
| 2011/0022492 A1 | 1/2011 | Karaoguz et al. | |
| 2011/0040655 A1 | 2/2011 | Hendrickson | |
| 2011/0112945 A1 | 5/2011 | Cullen, III et al. | |
| 2011/0161192 A1 | 6/2011 | Moderegger et al. | |
| 2011/0231339 A1 * | 9/2011 | Hansen | 705/36 R |
| 2012/0089509 A1 * | 4/2012 | Kasriel | G06Q 20/102 705/40 |

* cited by examiner

| Category | Description | Brand | Vendor 1 Price / Unit | Vendor 1 Pack Size | Vendor 2 Pack Size | Vendor 2 Price / Unit | Actual Cost | Description | Brand | Bid Winner | Include |
|---|---|---|---|---|---|---|---|---|---|---|---|
| [+] Beef | 6073693 BEEF GROUND 80/20 RAW REF | CATTLEMAN'S SELECTION | $67.34 | 10 LB | UNKNOWN | $63.26 | $63.26 | 5107223 ??BEEF GRAND 80/20 RAW REF | UNKNOWN | Vendor 2 | ✓ |
| [+] Beverages | 0403060 BAR MIX COCONUT CRAM SHELF STABLE COCKTAIL | COCO LOPEZ | $113.40 | 24/1 5 OZ | 24 | $102.44 | $102.44 | 1893340 Mix Cocktail Cream of Coconut | Cocolpz | Vendor 1 | ✓ |
| [+] Canned and Dry | 3295580 | | $0.00 | | 6 | $2.60 | $15.56 | 2846552 Spice Celery Salt | Imp/Mcc | Vendor 2 | ✓ |
| [+] Dairy | 980789 BUTTER SOLD GRADE AA UNSALTED REF | GLENVIEW FARMS | $171.98 | 36/1 LB | 36 | $2.60 | $15.56 | 2691059 Butter Solid Unslt Usda Aa | Whlfarm | Vendor 2 | ✓ |
| [+] Food (other) | 4505220 MEATBALL BEEF PORK 1 OZ ITALIAN COOKED FROZEN | FONTANINI | $63.76 | 2/5 LB | 1 | $61.90 | $61.90 | 3073817 Meatball Italian Prck 1 Oz | Fontai | Vendor 2 | ✓ |
| [+] Pork | 1728249 BACON PORK 18-22 COUNT LAID OUT SWEET HICKORY SMOCKED RAW FROZEN 1-DIAMOND | PATUXENT FARMS | $117.68 | 15 LB | 1 | $94.20 | $94.20 | 9435454 Bacon Layflat 18/22 Hcky Smkd | Rnchgrl | Vendor 2 | ✓ |
| [+] Poultry | 2323727 CHICKEN TENDERL-OIN CLIPPED JUMBO RAW REF CVP STRIP | PATUXENT FARMS | $182.88 | 4/10 LB | 4 | $136.36 | $136.36 | 6736375 Chicken Cvp Brst Tender Jumbo | Sys Cls | Vendor 2 | ✓ |
| [+] Produce | 7995130 AVOCADO HASS RIPE 12 COUNT FRESH REF | PACKER | $51.44 | 12 EA | 1 | $43.98 | $43.98 | 8551111 Avocado Hass Brkng Fresh | Sys Imp | Vendor 2 | ✓ |
| [+] Seafood | 0760346 CRABMEAT BLUE CLAW PASTEURIZED COOKED REF CAN IMPORTED WILD | ALL NATURAL | $96.62 | 6/1 LB | 6 | $114.36 | $114.36 | 9351236 Crab Meat Claiw Meat Past | Handy | Vendor 1 | ✓ |
| [+] Unknown | 6996433 APPETIZER CHS MOZZ BRDD | ANCHOR | $109.60 | 4/48 OZ | 4 | $121.56 | $121.56 | 1119596 Cheese Stick Mozz 3.25 Brd | ANCHOR | Vendor 1 | ✓ |

FIG. 7

| | | | | | | | |
|---|---|---|---|---|---|---|---|
| Category | Description | Brand | Cost | Pack Size | Vendor | Quantity | Total |
| [+] Beef | 5107223 ??BEEF GRND 80/20 RAW REF | UNKNOWN | 63.26 | UNKNOWN | Vendor 2 | 1 | $0.00 |
| Beef | 7906051 Beef Ground Pty 80/20/Frsh | Wol Pak | 99.36 | 32 | Vendor 2 | 2 | $0.00 |
| [+] Beverages | 0403060 BAR MIX COCONUT CREAM SHELF STABLE COCKTAIL | COCO LOPEZ | 113.40 | 24/15 OZ | Vendor 1 | 1 | $0.00 |
| Beverages | 1041831 JUICE GRAPEFRUIT RUBY RED DRINK 30% PLASTIC BOTTLE SHELF STABLE | OCEAN SPRAY | 48.08 | 8/60 OZ | Vendor 1 | 2 | $0.00 |
| Beverages | 4045119 JUICE LEMON CONCENTRATE PLASTC BOTTLE SHELF STABLE | REALEMON | 61.64 | 8/48 OZ | Vendor 1 | 3 | $0.00 |
| Beverages | 7671072 JUICE ORANGE 100% NOT-FROM-CONCENTRATE PURE PREMIUM PLASTIC JUGREF | TROPICANA | 80.54 | 4/128 OZ | Vendor 1 | 2 | $0.00 |
| Beverages | 0662520 JUICE PINEAPPLE 100% NOT-FROM-CONCENTRATE FANCY CAN SHELF STABLE | DOLE PACKAGED | 54.54 | 12/46 OZ | Vendor 1 | 2 | $0.00 |
| [+] Dairy | 2691059 Butter Solid Unslt Usda Aa | Whlfarm | 116.42 | 36 | Vendor 2 | 1 | $0.00 |
| [+] Food (others) | 3073817 Meatball Italian Prck 1 Oz | Fontani | 61.90 | 1 | Vendor 2 | 1 | $0.00 |
| [+] Pork | 9435454 Bacon Layflat 18/22 Hcky Smkd | Rnchgrl | 94.22 | 1 | Vendor 2 | 2 | $0.00 |
| [+] Poultry | 6736376 Chicken Cvp Brst Tender Jumbo | Sys Cls | 136.36 | 4 | Vendor 2 | 1 | $0.00 |
| [+] Produce | 8551111 Avocado Hass Brkng Fresh | Sys Imp | 43.98 | 1 | Vendor 2 | 5 | $0.00 |
| [+] Seafood | 0750346 CRABMEAT BLUE CLAW PASTEURIZED COOKED REF CAN IMPORTED WILD | ALL NATURAL | 96.62 | 6/1 LB | Vendor 1 | 1 | $0.00 |
| [+] Unknown | 6996433 APPETIZER CHS MOZZ BRDD | ANCHOR | 109.60 | 4/48 OZ | Vendor 1 | 1 | $0.00 |

COMPANY HOME    HISTORICAL PRICE ARCHIVE    VENDOR BIDS    [Sign Out]

Step One - Select Restaurant and Archive Pricing

[test 6/1/14 ▼] [Please Select a Week ▼] [Archive Current Pricing] — 1102

Please Select a Week
06/24/2014
07/01/2014
07/08/2014
07/15/2014
07/22/2014

COMPANY HOME    HISTORICAL PRICE ARCHIVE    VENDOR BIDS    [Sign Out]

Step One - Select Restaurant and Archive Pricing

[test 6/1/14 ▼] [07/15/2014 ▼] [Archive Current Pricing]

Step Two - Import Vendor 1

This step requires a csv file with a first column of Product Number and a second column of Price. Includes a header row as the first row is skipped.

Vendor 1 pricing:  [Choose File] No file chosen    [Import]

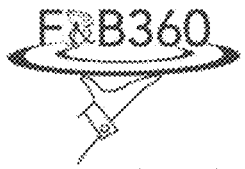

COMPANY HOME    HISTORICAL PRICE ARCHIVE    VENDOR BIDS    Sign Out

Step One - Select Restaurant and Archive Pricing

[test 9/1/14 ▼] [9/16/2014 ▼] [Archive Current Pricing]

Step Two Complete

Step Three Complete

Step Four Complete

Pricing Import Complete!

FIG. 14A

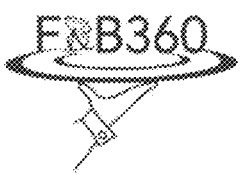

COMPANY HOME    HISTORICAL PRICE ARCHIVE    VENDOR BIDS    Sign Out

Step One - Select Restaurant and Archive Pricing

[test 9/1/14 ▼] [9/16/2014 ▼] [Archive Current Pricing]

Step Two Complete

Step Three Complete

Step Four Skipped - Matching Not Needed ← 1410

Pricing Import Complete!

| | A | B |
|---|---|---|
| 1 | Vendor 2 | Product Price |
| 2 | 37778 | 23 |
| 3 | 37992 | 76.67 |
| 4 | 71677 | 34.79 |
| 5 | 54251 | 57.26 |
| 6 | 16411 | 29.78 |
| 7 | 51931 | 53.01 |
| 8 | 73174 | 53.37 |
| 9 | 07541 | 36.87 |
| 10 | 25857 | 39.06 |
| 11 | 48099 | 29.14 |
| 12 | 48313 | 29.19 |
| 13 | 94721 | 20.38 |
| 14 | 31388 | 43.16 |
| 15 | 85511 | 21.99 |
| 16 | 37056 | 113.83 |
| 17 | 00219 | 59.16 |
| 18 | 20100 | 22.72 |
| 19 | 96712 | 23.06 |
| 20 | 46654 | 92.84 |
| 21 | 70878 | 22.94 |
| 22 | 90934 | 19.72 |
| 23 | 78747 | 25.89 |
| 24 | 23816 | 25.32 |
| 25 | 24244 | 102.58 |
| 26 | 30738 | 30.95 |
| 27 | 63440 | 30.22 |
| 28 | 94882 | 11.83 |
| 29 | 03295 | 97.68 |
| 30 | 54694 | 19.11 |
| 31 | 50850 | 86.32 |
| 32 | 70991 | 165.69 |
| 33 | 00139 | 32.33 |
| 34 | 77352 | 23.17 |
| 35 | 05823 | 25.63 |
| 36 | 88233 | 74.95 |
| 37 | 94041 | 157.82 |
| 38 | 19095 | 18.33 |

| Vendor 2, Inc. | | | |
|---|---|---|---|
| Customer Number: | | 654321 | |
| Invoice # | | 9874659847 | |
| Invoice Date | | 5/28/2014 | |
| Product Number | Invoice Price | Qty | Invoice Total |
| 1094732 | 21.02 | 5 | 105.1 |
| 1300230 | 59.19 | 5 | 295.95 |
| 137789 | 24.53 | 3 | 73.59 |
| 1570889 | 22.97 | 4 | 91.88 |
| 1724255 | 106.02 | 1 | 106.02 |
| 1794893 | 11.86 | 1 | 11.86 |
| 1971002 | 169.27 | 2 | 338.54 |
| 2000150 | 35.02 | 3 | 105.06 |
| 2077363 | 23.20 | 3 | 69.6 |
| 2219106 | 18.36 | 4 | 73.44 |
| 3127621 | 20.86 | 4 | 83.44 |
| 3629444 | 11.24 | 4 | 44.96 |
| 3812982 | 33.71 | 6 | 202.26 |
| 4029081 | 61.28 | 2 | 122.56 |
| 4113060 | 14.02 | 5 | 70.1 |
| 4113067 | 22.97 | 7 | 160.79 |
| 4692251 | 18.92 | 3 | 56.76 |
| 4828813 | 34.67 | 2 | 69.34 |
| 5061258 | 232.85 | 1 | 232.85 |
| 5239798 | 52.53 | 1 | 52.53 |
| 5757102 | 22.77 | 2 | 45.54 |
| 6174018 | 32.70 | 2 | 65.4 |
| 6317849 | 20.02 | 3 | 60.06 |
| 6634500 | 133.22 | 1 | 133.22 |
| 671688 | 34.82 | 1 | 34.82 |
| 6855475 | 20.48 | 1 | 20.48 |
| 7025068 | 88.99 | 1 | 88.99 |
| 7149738 | 18.92 | 3 | 56.76 |
| 7327548 | 120.68 | 1 | 120.68 |
| 7554854 | 41.62 | 1 | 41.62 |
| 7710976 | 35.97 | 1 | 35.97 |
| 7873254 | 33.69 | 2 | 67.38 |
| 8282605 | 35.91 | 2 | 71.82 |
| 8399936 | 9.98 | 8 | 79.84 |
| 918422 | 29.81 | 1 | 29.81 |
| 9611206 | 60.81 | 1 | 60.81 |
| | | BALANCE DUE | 3379.81 |

COMPANY HOME    HISTORICAL PRICE ARCHIVE    VENDOR BIDS

Sign Out

Step One - Select Restaurant and Archive Pricing

[test 6/1/14 ▾] [07/15/2014 ▾] [Archive Current Pricing]

Step Two Complete

Step Three Complete

Step Four - Match Unmatched Products

This step requires a csv file with columns of Vendor 1 Product Number, Vendor2 Product Number, and Ratio (of Vendor1 units to Vendor2 units) for comparison. Include a header row as the first row is skipped.

If a product is unmatched, leave its column blank.

Matched products: [Choose File] No file chosen    [Import]
                    2710                              2720

FIG. 27

SYSTEMS, MANUFACTURES, AND METHODS FOR COMPARATIVE BID ANALYSIS AND PURCHASE ORDER PREPARATION

RELATED APPLICATION

The present disclosure claims priority to U.S. Ser. No. 61/867,401, titled "Systems and Methods for Creation of Real-Time, Interactive Communication Based Accounting Functionality," filed on Aug. 19, 2013, the contents of which are hereby incorporated by reference.

TECHNICAL FIELD

The disclosure generally relates to the wholesale good industry, and more particularly relates to systems and methods for providing comparative bid analysis and purchase order preparation.

BACKGROUND

In the wholesale marketplace, suppliers typically control pricing. Buyers desire competition on price, and are frustrated with uncertainty about ordering at the best price amongst competing suppliers.

Buyers and vendors can have different information needs, and often times those needs may be relatively specialized, custom views of information about price data, comparative pricing, order guides, supplier databases, or price discrepancies. These unique needs may be satisfied through a query of an information database or other data storage device which can contain information about the pricing and bidding process from suppliers. The query can provide a set of results as items, such as weekly pricing and product descriptions. Many conventional data management systems may support such specialized queries of databases and other data storage devices, and may display the query results in a tabular form.

These types of queries and user interfaces can have drawbacks. For example, query results from these conventional data management systems can be time consuming to read and use. In some instances, relatively important information or other particularly relevant information in a query result may not be readily apparent or may appear later in the query results, and can often be overlooked by the buyer who is frequently ordering many different items at different quantities from multiple vendors. Wherein the different vendors sometimes package or group together products in different numbers or weight of the item (e.g. 4 lbs for $20 vs. 3 lbs $14), which requires more time for buyer to decide which vendor to order from.

Other conventional solutions, can be provided by certain data system vendors as add-on systems to an existing enterprise data management system in use at a business. Almost all businesses use multiple data management systems that may handle different aspects of pricing, inventory supply, invoice presentment, and creating purchase orders. However, data management systems typically do not handle price discrepancy comparison nor the ability to compare two or more wholesale vendors by equivalent items. Furthermore, certain conventional systems provided by data system vendors may only relate to a particular data management system used in the business, or may only show current status information. Such solutions may not integrate some or all of the data management systems used by the business, and may not provide an overall pricing comparison at individual product level and price discrepancy between a quoted price and final price paid via purchase order.

SUMMARY OF THE DISCLOSURE

According to example embodiments of the disclosure, systems and methods for providing comparative bid analysis and purchase order preparation are described herein. Some or all of the above problems may be addressed by certain embodiments of the disclosure.

In an example embodiment, there is disclosed a method. The method may include receiving price data from one or more vendors; based at least in part on the received price data, identifying similar items from the two or more vendors; comparing the identified similar items to determine a lowest price; generating one or more indications for output to a user to verify price data; based at least in part on the received price data, generating a proposed purchase order selecting the lowest price for some or all of the identified items; providing the proposed purchase order for the user to select one or more items; after user approval, generating a purchase order for the two or more vendors utilizing some or all of the user-selected items in the proposed purchase order; and transmitting the purchase order to the two or more vendors.

In another embodiment, there is disclosed a system. The system may include at least one memory that stores computer-executable instructions and at least one processor configured to access the at least one memory, wherein the at least one processor may execute computer-executable instructions. The instructions are to receive price data from one or more vendors; based at least in part on the received price data, identify similar items from the two or more vendors; compare the identified similar items to determine a lowest price; generate one or more indications for output to a user to verify price data; based at least in part on the received price data, generate a proposed purchase order selecting the lowest price for some or all of the identified items; provide the proposed purchase order for the user to select one or more items; after user approval, generate a purchase order for the two or more vendors utilizing some or all of the user-selected items in the proposed purchase order; and transmit the purchase order to the two or more vendors.

In another embodiment, there is disclosed one or more computer-readable media storing computer-executable instructions. The one or more computer-readable media may store computer-executable instructions that, when executed by at least one processor, configure the at least one processor to perform operations which may include: receiving price data from one or more vendors; based at least in part on the received price data, identifying similar items from the two or more vendors; comparing the identified similar items to determine a lowest price; generating one or more indications for output to a user to verify price data; based at least in part on the received price data, generating a proposed purchase order selecting the lowest price for some or all of the identified items; providing the proposed purchase order for the user to select one or more items; after user approval, generating a purchase order for the two or more vendors utilizing some or all of the user-selected items in the proposed purchase order; and transmitting the purchase order to the two or more vendors.

Other systems, methods, apparatuses, features, and aspects according to various embodiments of the disclosure will become apparent with respect to the remainder of this document.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIGS. 4-27 illustrate example user interfaces according to example embodiments of the disclosure.

DETAILED DESCRIPTION OF EXAMPLE EMBODIMENTS

Figure 1:
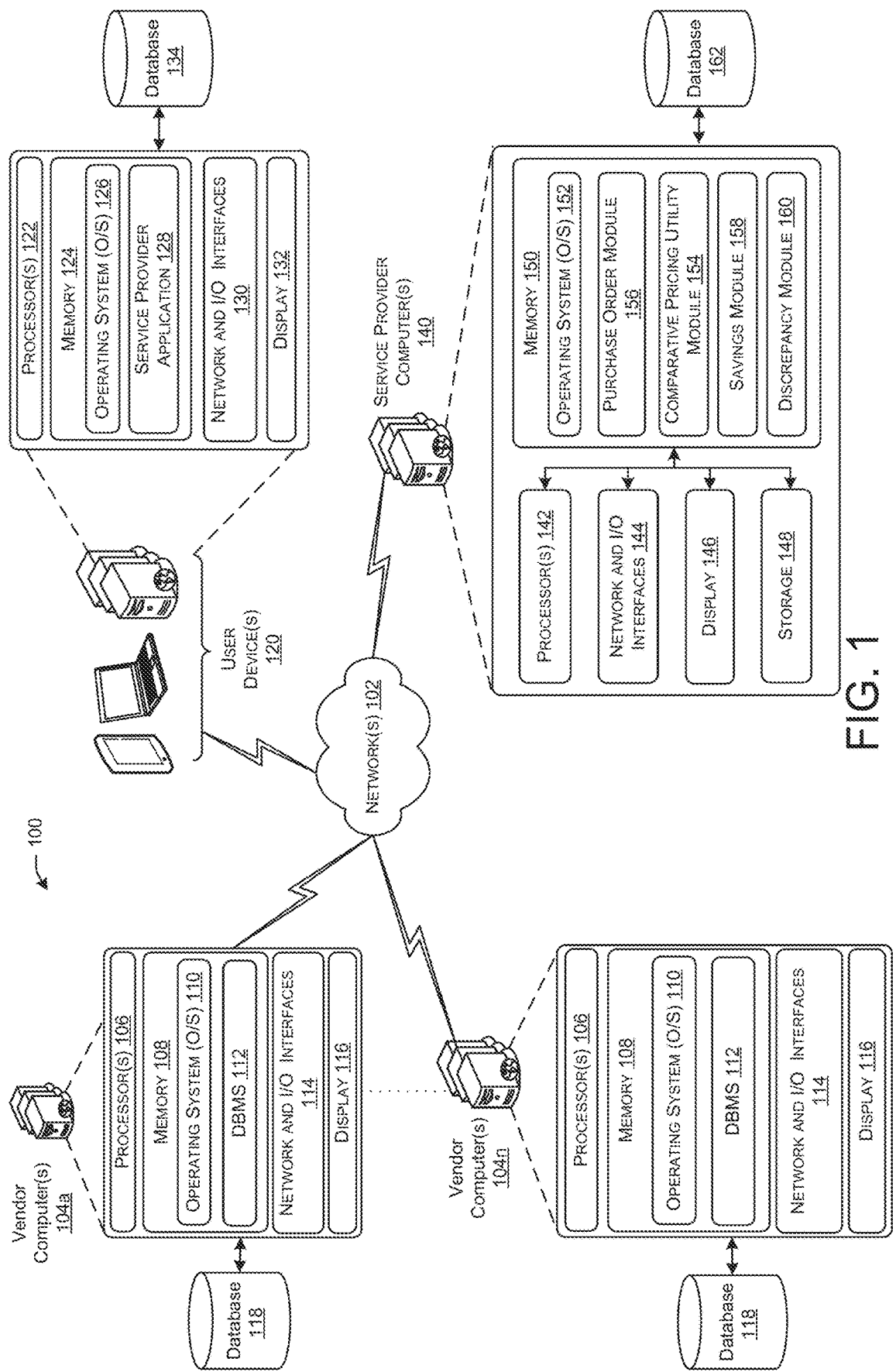
FIG. 1 illustrates an example system, according to an example embodiment of the disclosure.

Embodiments of the disclosure will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those of ordinary skill in the art. Like numbers refer to like elements throughout.

Embodiments of the disclosure can provide systems and methods for providing comparative bid analysis and purchase order preparation. In one example embodiment, price data received from one or more vendors can be used to identify similar items from the vendors. A comparison among similar items can be performed to determine a lowest price for the similar items from the vendors. The user can be notified of the lowest price, and can be prompted to select or verify a selection of one or more items. A proposed purchase order can be generated selecting the lowest price for some or all of the user-selected items and the purchase order can be transmitted to the respective vendor or vendors.

In one embodiment, price data can automatically be received from two or more vendors for a predefined period of time, such as determined by the user. The price data can be automatically retrieved or otherwise requested from each of the two or more vendors.

In one embodiment, a user interface can be generated for output to a display device. Some or all of the price data may be presented as status updates in the user interface by way of a unique visual display algorithm. For example, a visual display algorithm can include, but is not limited to, multiple tiers of indications including a background color and timer, one or more rotating status icons and timers, text based labels, and an organized visual palette for any number of components, such as a geospatial arrangement or map, a spreadsheet style grid, or a cross-sectional list of patients and rooms. Certain embodiments of the disclosure can provide transport mechanics to facilitate output of the user interface to one or more users. In one example, a user interface can be provided to any number of display devices, handheld computers, wearable computers, and/or desktop computers.

In one embodiment, when identifying similar items from the two or more vendors, the received price data can be grouped into a predefined workflow of one or more activities. If the identified similar items have a mismatched price per standard unit of measure; the mismatched similar items can be converted to equivalent items. For example, in certain embodiments, a conversion can be facilitated by creating a matching spreadsheet with the similar items and the equivalent items, and identifying a lowest price from the matching spreadsheet for each of the similar items and the equivalent items utilizing a price per standard unit of measure.

In the manner described above, certain embodiments of the systems and methods can provide an overall data integration, process compliance, and visual information package to help a business manage comparative pricing needs.

These and other embodiments are described more fully below with reference to the accompanying figures, in which embodiments of the disclosure are shown.

FIG. 1 is an example system in accordance with various embodiments of the disclosure. The system 100 shown is by way of example, and the system 100 can operate in a variety of environments, such as restaurants, retail, or any type of buyer and seller industry. Referring back to FIG. 1, a system 100 is shown with a communications network 102 in communication with one or more vendor computers 104A-104N. Any number of vendor computers 104A-104N can also be in communication with the network 102. The communications network 102 shown in FIG. 1 can be a wireless communications network or the Internet. Other types of communication networks can be used in accordance with various embodiments of the disclosure.

Each vendor computer 104A-104N can be a computer or processor-based device capable of communicating with the network(s) 102 via a signal, such as a wireless frequency signal or a direct wired communication signal. The one or more vendor computer(s) 104A-104N may include one or more computer processors 106, a memory 108 storing an operating system 110, and one or more database management systems (DBMS) 112. In addition, the one or more vendor computer(s) 104A-104N may include network and I/O interfaces 114 and a display 116. The processor 106 can execute computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 106, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C #, Visual Basic, Java, Python, Perl, and JavaScript.

The one or more computer processors 106 may comprise one or more cores and may be configured to access and execute (at least in part) computer-readable instructions stored in the memory 108. The one or more computer processors 106 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The one or more vendor computer(s) 104A-104N may also include a chipset (not shown) for controlling communications between the one or more processors 106 and one or more of the other components of the respective vendor computer 104A-104N. In certain embodiments, the one or more vendor computer(s) 104A-104N may be based on an Intel® architecture or an ARM® architecture, and the processor(s) and chipset may be from a family of Intel® processors and chipsets. The one or more processors 106 may also include one or more application-specific integrated circuits (ASICs) or application-specific standard products (ASSPs) for handling specific data processing functions or tasks.

The memory 108 may include one or more computer-readable storage media (CRSM). In some embodiments, the memory 108 may include non-transitory media such as random access memory (RAM), flash RAM, magnetic media, optical media, solid state media, and so forth. The memory 108 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 108 may store an operating system 110 that includes a plurality of computer-executable instructions that may be implemented by the computer processor to perform a variety of tasks to operate the interface(s) and any other hardware installed on the respective vendor computer 104A-104N. The memory 108 may also store content that may be displayed by the respective vendor computer 104A-104N or transferred to other devices (e.g., headphones) to be displayed or played by the other devices. The memory 108 may also store content received from the other devices. The content from the other devices may be displayed, played, or used by the respective vendor computer 104A-104N to perform any necessary tasks or operations that may be implemented by the computer processor or other components in the respective vendor computer 104A-104N.

The DBMS 112 may be loaded into the memory 108 and may support functionality for accessing, retrieving, storing, and/or manipulating data stored in one or more of the datastores (not shown), data stored in the memory 108, and/or data stored in the database 118. The DBMS 112 may use any of a variety of database models (e.g., relational model, object model, etc.) and may support any of a variety of query languages. The datastore(s) may include any suitable data repository including, but not limited to, databases (e.g., relational, object-oriented, etc.), file systems, flat files, distributed datastores in which data is stored on more than one node of a computer network, peer-to-peer network datastores, or the like. Any of the datastore(s) may represent data in one or more data schemas.

Furthermore, as shown in the embodiment of FIG. 1, a database 118 can be accessible by the vendor computer(s) 104A-104N. The database 118 can include any type of data storage device and/or any number of data storage devices. An example of the type of data stored in the database 118 to be used by the embodiment is the price data.

The network and I/O interfaces 114 may also include one or more communication interfaces or network interface devices to provide for the transfer of data between the respective vendor computer 104A-104N and another device (e.g., network server) via a network (not shown). The communication interfaces may include, but are not limited to: personal area networks (PANs), wired local area networks (LANs), wireless local area networks (WLANs), wireless wide area networks (WWANs), and so forth. The respective vendor computer 104a-104n may be coupled to the network 102 via a wired connection. However, the wireless system interfaces may include the hardware and software to broadcast and receive messages either using the Wi-Fi Direct Standard (see Wi-Fi Direct specification published in October 2010) and/or the IEEE 802.11 wireless standard (see IEEE 802.11-2007, published Mar. 8, 2007; IEEE 802.11n-2009, published October 2009), or a combination thereof. The wireless system (not shown) may include a transmitter and a receiver or a transceiver (not shown) capable of operating in a broad range of operating frequencies governed by the IEEE 802.11 wireless standards. The communication interfaces may utilize acoustic, radio frequency, optical, or other signals to exchange data between the respective vendor computer 104A-104N and another device, such as an access point, a host computer, a server, a router, a reader device, and the like. The network 102 may include, but is not limited to, the Internet, a private network, a virtual private network, a wireless wide area network, a local area network, a metropolitan area network, a telephone network, and so forth.

The display 116 may include, but is not limited to, a liquid crystal display, a light-emitted diode display, or other suitable display or output-type device. The display 116 may be used to show content to a user in the form of text, images, or video. In certain instances, the display 116 may also operate as a touch screen display that may enable the user to initiate commands or operations by touching the screen using certain finger or hand gestures.

Vendor computers 104A-104N may also comprise a number of external or internal devices such as a mouse, a CD-ROM, DVD, a keyboard, a display, or other input or output devices. As shown in FIG. 1, a vendor computer such as 104A can be in communication with a user device, such as 120, via the network(s) 102. Examples of vendor computer(s) 104A-104N are personal computers, mobile computers, handheld portable computers, wearable computers, digital assistants, personal digital assistants, cellular phones, mobile phones, smart phones, pagers, digital tablets, pad devices, desktop computers, laptop computers, Internet appliances, and other processor-based devices. In general, a vendor computer, such as 104A-104N, may be any type of processor-based platform that is connected to a network, such as 102, and that interacts with one or more application programs. Vendor computer(s) 104A-104N may operate on any operating system capable of supporting a browser or browser-enabled application, such as Microsoft® Windows® or Linux. The vendor computer(s) 104A-104N shown include, for example, personal computers executing a browser application program such as Microsoft Corporation's Internet Explorer™, Netscape Communication Corporation's Netscape Navigator™, and Apple Computer, Inc.'s Safari™.

The system 100 may include one or more user devices(s) 120 in network and/or direct communication with one or more vendors and/or one or more service providers. In general, the user device(s) 120 may refer to any type of electronic device, and, more particularly, may refer to one or more of the following: a wireless communication device, a portable electronic device, a telephone (e.g., cellular phone, smart phone), a computer (e.g., laptop computer, tablet computer), a wearable computer device, a portable media player, a personal digital assistant (PDA), or any other electronic device having a networked capability. The one or more user devices 120 may include one or more computer processors 122, and a memory 124 storing an operating system 126 and a service provider application 128. In addition, the one or more user device(s) 120 may include a network and I/O interface 130 and a display 132. In certain embodiments, the one or more user device(s) 120 may include one or more sensors capable of gathering information associated with a present environment of the respective user device 120, or similar hardware devices, such as a camera, microphone, antenna, a gesture capture or detection device, or Global Positioning System (GPS) device.

In the particular example shown in FIG. 1, a service provider application 128 stored in memory 124 may be configured to interface with a user and provide or otherwise facilitate comparative bid analysis and automated cross-reference of invoiced pricing to create purchase order(s) functionality to the user. For instance, the service provider application 128 may be operable to communicate with one or more service providers, and may be in communication with one or more respective service provider computers 140 associated with at least one service provider. As such, the service provider application 128 may enable the user to access information and/or services associated with a respective service provider. For example, the service provider application 128 may enable the user to receive data, such as price information, products, quantities, volume discounts, etc., from any number of service providers operating respective service provider computers 140.

Furthermore, as shown in the embodiment of FIG. 1, a database 134 can be accessible by the user device(s) 120. The database 134 can include any type of data storage device and/or any number of data storage devices. An example of the type of data stored in the database 134 to be used by the embodiment is the order guide information.

The one or more user devices 120 may also be in communication with one or more service provider computers 140, such as via one or more network(s) 102. The one or more service provider computers 140 may include one or more processors 142 and at least one memory 150 which may store an operating system 152, and at least one module (e.g. comparative price utility module 154, purchase order module 156, savings module 158, and/or discrepancy module 160). In some embodiments, one or more of the various modules 154, 156, 158, and 160, may be associated with or otherwise hosted by different entities, service providers, and/or service provider computers 140. Furthermore, the one or more service provider computers 140 may include respective network and I/O interfaces 144, a display 146, and storage 148. In some implementations, the one or more service provider computers 140 may be associated with one or more user device(s) 120.

The comparative price utility module 154 may include computer-executable instructions that responsive to execution by one or more of the processor(s) 142 may cause operations to be performed in connection with identifying a lowest price from a matching spreadsheet for each of the similar and the equivalent items utilizing a price per standard unit of measure. The data for the matching spreadsheet, for example, may include at least two or more vendors' price data that is sent to the user as described herein. For example, computer-executable instructions of the comparative price utility module 154 may be executed to determine whether an identified similar item(s) are utilizing a mismatched price per standard unit of measure.

If the comparative price utility module 154 determines that a mismatched price per standard unit of measure for each of the identified similar items, computer-executable instructions of the comparative price utility module 154 may be executed to convert the mismatched similar items into equivalent items using a predefined workflow, where the predefined workflow includes one or more activities.

For example, computer-executable instructions of the comparative price utility module 154 may be executed to receive vendor pricing, create updated vendor pricing list, archive previous vendor pricing, and provide current pricing upon request.

The purchase order module 156 may include computer-executable instructions that responsive to execution by one or more of the processor(s) 142 may cause operations to be performed in connection with creating a purchase order. Through access of the service provider application home page, the user may select create a purchase order.

If the purchase order module 156 determines that a mismatched price per standard unit of measure for each of the identified similar items, computer-executable instructions of the purchase order module 156 may be executed to create a purchase order using a predefined workflow, where the predefined workflow includes one or more activities.

For example, computer-executable instructions of the purchase order module 156 may be executed to allow the user device(s) 120 to receive purchase order form and select preferred vendor, and if other than lowest-price default vendor, select "save and calculate" to transmit. An associated user interface may receive pricing information (with preferred vendors) and create purchase order with an editable quantity field. The user device(s) 120 may be used to enter quantities as needed with the "save and calculate" or "submit" buttons. When the user device(s) 120 update the quantities and "save and calculate" is selected, the user device(s) 120 may receive and display purchase order form and request confirmation or changes. The user device(s) 120 may then receive purchase order and allow a user to confirm and "submit" or modify and "save and calculate". When the user device(s) 120 selects "submit," the user device(s) 120 may receive confirmed purchase order and generate purchase order, and allow to print the purchase order.

For example, computer-executable instructions of the purchase order module 156 may be executed for the user to receive the confirmed purchase order and send to one or more vendor computer(s) 104A-104N or to user device(s) 120, and/or archive for later comparison in the database 162. The user device(s) 120 may then receive final purchase orders for each vendor and send to each respective one or more vendor computer(s) 104A-104N (see FIG. 9). Thus, in certain embodiments of the disclosure, the user device(s)

120 may send the purchase orders to the one or more vendor computer(s) 104A-104N directly (via mail, fax, electronic mail, etc.), or the user device(s) 120 may send the confirmed purchase orders directly to the one or more vendor computer(s) 104A-104N (see FIG. 2 described herein).

The savings module 158 may include computer-executable instructions that responsive to execution by one or more of the processor(s) 142 may cause operations to be performed in connection with identifying the total savings for the user by utilizing the system and methods described herein. The data for the savings totals, for example, may include totals by using the purchase order module 156 as described herein over only running purchase orders as a standard method. For example, computer-executable instructions of the savings module 158 may be executed to total running savings and create a table showing weekly listings.

Further, computer-executable instructions of the savings module 158 may be executed to total the amount of all purchase orders for the week, total the amount of all invoices for the week, total the amount actually paid for the week, and total amount of savings by subtracting total amount actually paid for the week from total amount of all invoices for the week. In certain embodiments, computer-executable instructions of the savings module 158 may be executed to show the total running savings calculated by using the system and methods to the user.

The discrepancy module 160 may include computer-executable instructions that responsive to execution by one or more of the processor(s) 142 may cause operations to be performed in connection with and calculate any pricing discrepancy with the one or more vendors. For example, computer-executable instructions of the discrepancy module 160 may be executed to compare the quoted price for each product with the invoiced price for each product for each of the one or more vendors, and calculates the pricing discrepancy accordingly.

For example, computer-executable instructions of the discrepancy module 160 may be executed to notify the service provider administrator and/or the user via a discrepancy report if the discrepancy module 160 determines a pricing discrepancy exists between the quoted price and the invoice from the one or more vendors, allowing the user to short-pay the invoice for any discrepancy in pricing.

As part of the processing described above, the comparative price utility module 154, purchase order module 156, savings module 158, and/or discrepancy module 160 may utilize input data included among the data file(s) and/or store output data as part of the data file(s). The data file(s) may include any of the example types of data depicted in FIG. 1. In addition, any of the example types of data depicted in FIG. 1 as well as any suitable output data generated from comparative bid analysis processing (e.g., proposed updated purchase order information) may be stored in the database 162.

In one example embodiment, the system utilizes a database 162, which can be modified to add and delete items and item information. The database 162 may contain one more vendor's product codes or product numbers, item descriptions, quantities, manufacturers, and units of measurement. In another example embodiment, the database 162 stores matched product codes (hereinafter "matches") imported with conversion ratios. Matches are like-kind products from separate vendors. Matches are considered to be suitable substitutes, e.g. the user does not prefer one of the matched products over the other(s). When pricing information is imported, the information stored in the underlying database (product description, quantity, unit of measurement, manufacturer, etc.) as it relates to the respective product code is populated in the user interface.

The system 100 shown in, and described with respect to, FIG. 1 is provided by way of example only. Numerous other systems, operating environments and components, system architectures, and device configurations are possible. Additionally, certain components of the system 100 may be combined in various embodiments of the disclosure. Accordingly, embodiments of the disclosure should not be construed as being limited to any particular system, operating environment or component, system architecture, or device configuration.

FIGS. 2A, 2B, 2C, 2D, 2E, and 2F (collectively referred to as "FIG. 2" herein) illustrate an example data flow, according to an example embodiment of the disclosure. The data flow 200 illustrates a data flow model that may be used in an online system for providing comparative bid analysis and automated cross-reference of invoiced pricing to create purchase orders for each vendor, such as the system 100 in FIG. 1. One or more operations of the data flow 200 may be described herein as being performed by the user device(s) 120, the service provider computer 140, the vendor computers 104A-104N, or more specifically, one or more program modules executing on the service provider computer 140 such as, for example, the comparative price utility module 154, the purchase order module 156, the savings module 158, and/or the discrepancy module 160. The identified inputs, outputs and internal data flows described herein do not represent the exclusive applicability of the disclosure, but are intended to give an example of how embodiments of the disclosure may be utilized in the creation of a platform solution for providing comparative bid analysis and automated cross-reference of invoiced pricing to create purchase orders for each vendor. Furthermore, operations of the data flow 200 illustrated in FIG. 2 may be altered, extended or omitted depending on the pathway of the ordering process and decisions of the user. The individual modules and functional units of the data flow 200 can be segregated in FIG. 2 for demonstration purposes only and to facilitate description of the individual processes within a system for comparative bid analysis and automated cross-reference of invoiced pricing to create purchase orders for each vendor. Various embodiments of the disclosure may be implemented using a wide range of data flow and processing architectures.

Figure 2A:
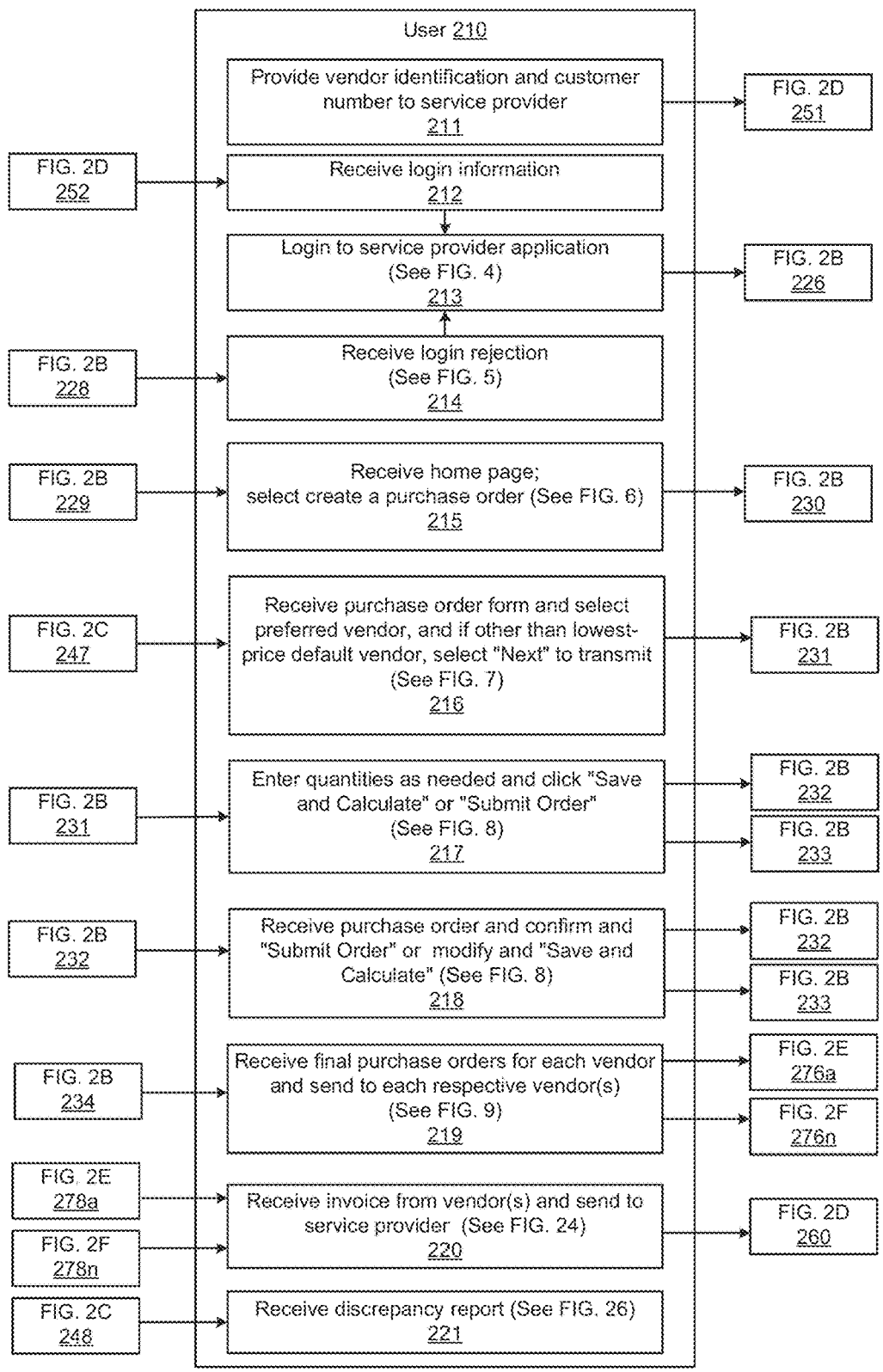
FIGS. 2A-2F illustrates an example data flow, according to an example embodiment of the disclosure.
Figure 2B:
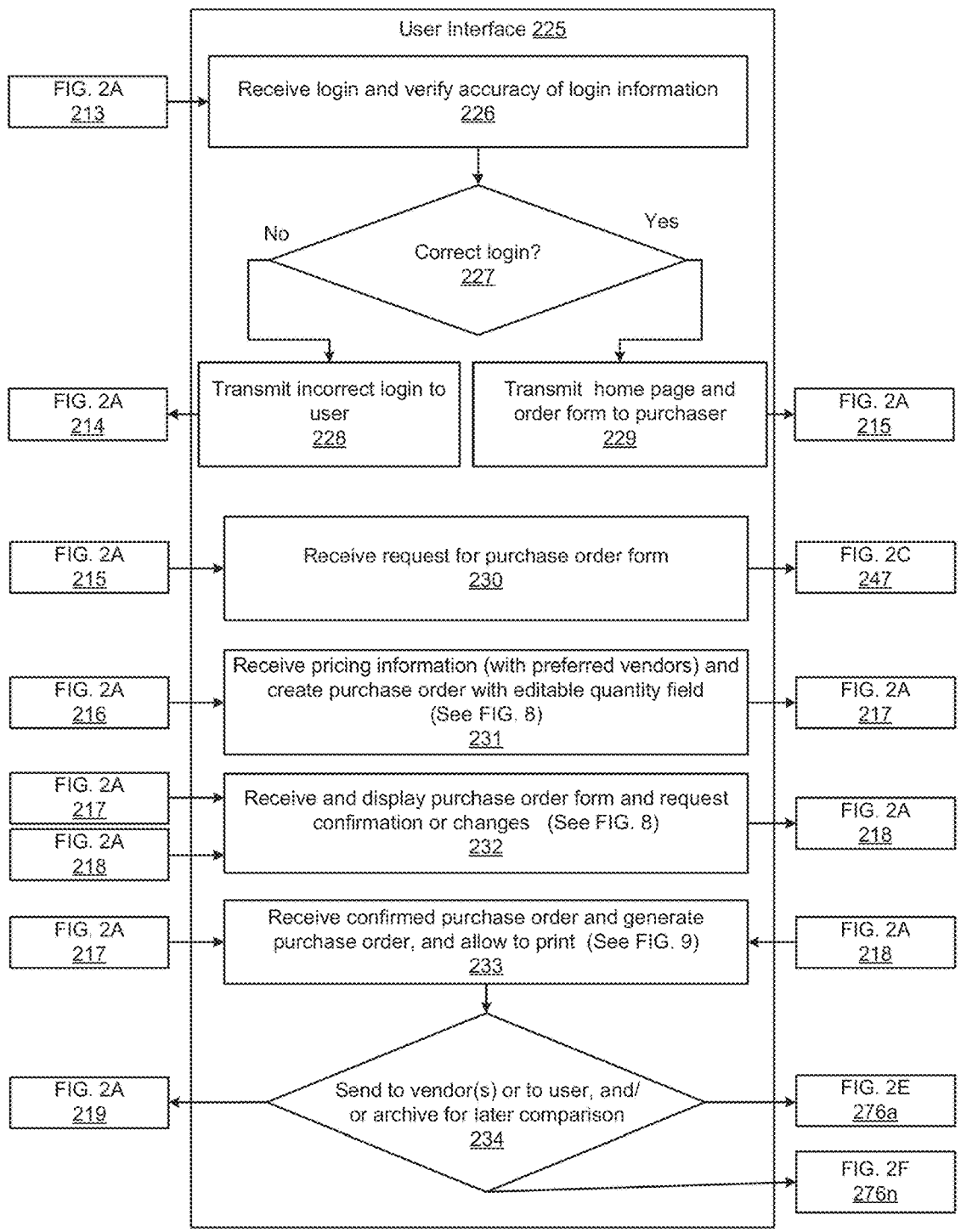

FIGS. 2A and 2B illustrate an example data flow, according to an example embodiment of the disclosure. Specifically, FIGS. 2A and 2B represent the user's perspective of the data flow which may utilize, for example, the service provider application 128 as described herein. More specifically, FIG. 2A represents the actions the may be completed by the user 210, and FIG. 2B represents the user interface 225 utilizing the service provider application 128, in communication with the service provider computer(s) 140 and the one more vendor computer(s) 104a-104n via the network(s) 102. One of the tasks performed by the user 210 may be to provide vendor identification and customer number to service provider 211. Another task performed by the user 210 may be to receive login information 212 from the service provider and login to service provider application 213 (see FIG. 4). The user interface 225 may receive login and verify accuracy of login information 226. The system may verify whether a correct login 227 was received and if an incorrect login was provided, the system may transmit incorrect login to user 228, and the user may receive login rejection 214 (see FIG. 5), and the user 210 may try again to login to service provider application 213 (see FIG. 4). If the correct login 227 was entered by the user 210, the system may transmit home page and order form to purchaser 229. The user 210 may receive home page, and select create a purchase order 215 (see FIG. 6). After the user 210 selects to create a purchase order, the user interface 225 may receive request for purchase order form 230, and the system may send the request to the service provider interface 240, and in certain embodiments of the disclosure the service provider interface 240 may receive vendor pricing, create updated vendor pricing list, archive previous vendor pricing, and provide current pricing upon request 247 (see FIG. 2C described herein).

In certain embodiments of the disclosure, the user 210 may be able to receive purchase order form and select preferred vendor, and if other than lowest-price default vendor, select "next" to transmit 216 (see FIG. 7). The user interface 225 may receive pricing information (with preferred vendors) and create purchase order with editable quantity field 231 (see FIG. 8). The user 210 may enter quantities as needed and click "save and calculate" or "submit" 217 (see FIG. 8). When the user 210 updates the quantities and selects "save and calculate," the user interface 225 may receive and display purchase order form and request confirmation or changes 231 (see FIG. 8). The user 210 may then receive purchase order and confirm and "submit" or modify and "save and calculate" 218 (see FIG. 8). When the user 210 selects "submit," the user interface 225 may receive confirmed purchase order and generate purchase order, and allow to print 233 (see FIG. 9). In certain embodiments of the disclosure, the user interface 225 may receive the confirmed purchase order and send to vendor(s) or to user, and/or archive for later comparison 234. The user 210 may then receive final purchase orders for each vendor and send to each respective vendor(s) 219 (see FIG. 9). Thus, in certain embodiments of the disclosure, the user 210 may send the purchase orders to the vendor directly (via mail, fax, electronic mail, etc.), or the user 210 may have the user interface 225 send the confirmed purchase orders directly to the vendors, utilizing the purchase order module 156 described herein.

Figure 2C:
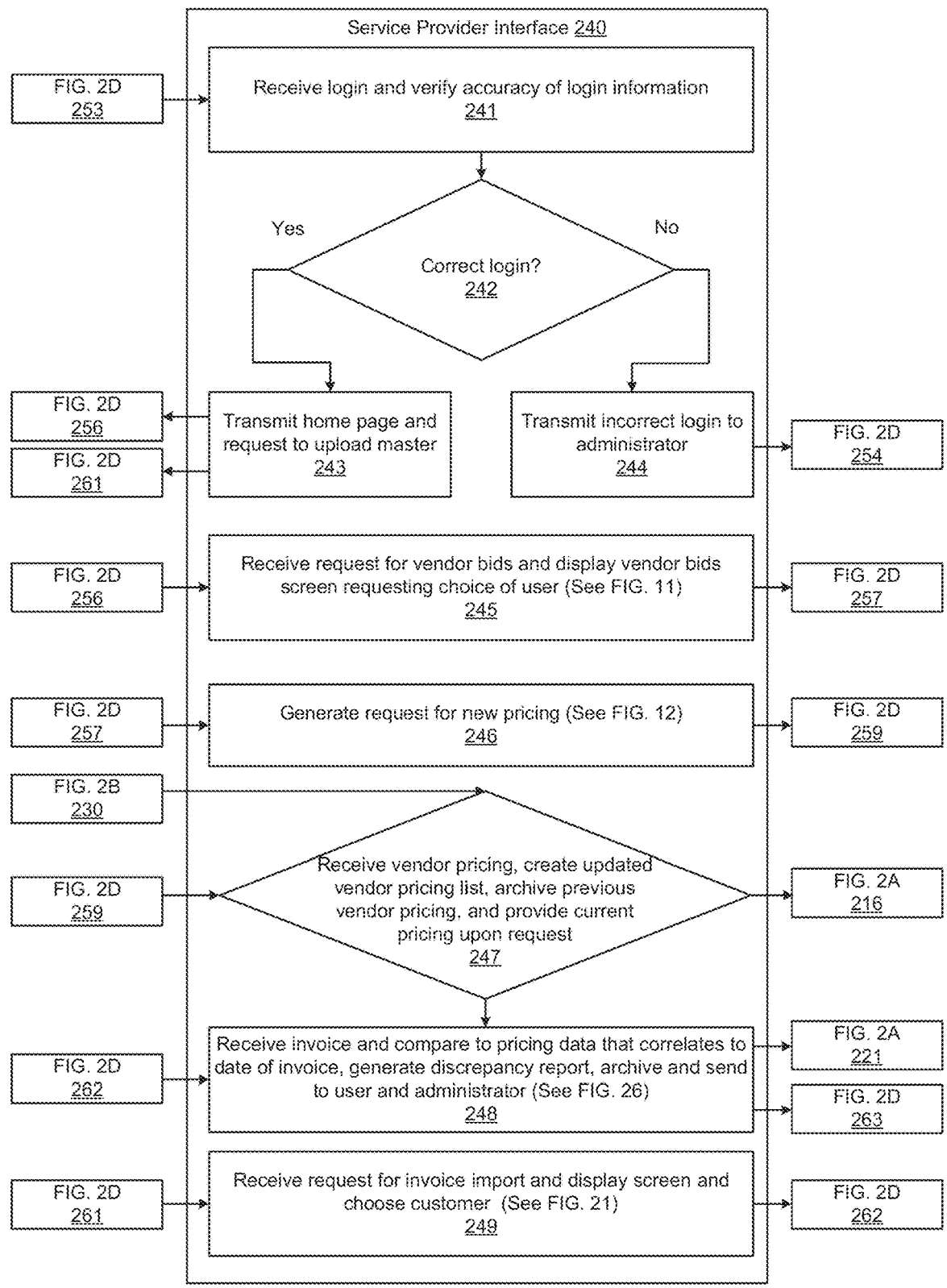
Figure 2D:
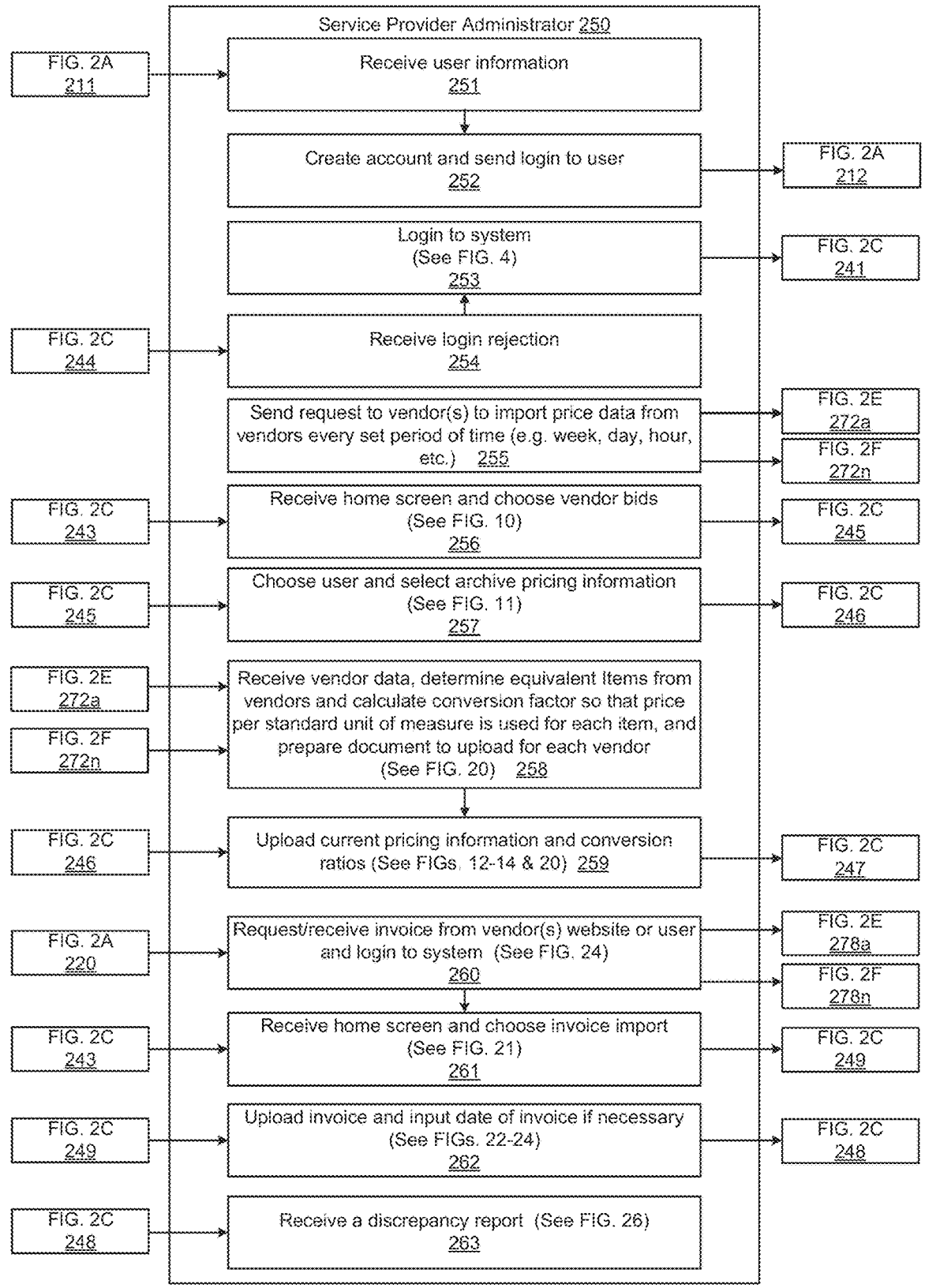

In certain embodiments of the disclosure, the one or more vendors (vendor a 270A-vendor n 270N) will prepare order, generate invoice, and upload invoice to website and/or send invoice to client 278A-278N (see FIG. 24), and the user 210 will receive invoice from vendor(s) and send to service provider 220 (see FIG. 24 and FIG. 2D).

In certain embodiments of the disclosure, the user 210 will receive a discrepancy report 221 (see FIG. 25) generated from the service provider interface 240 (see FIG. 2D) utilizing the discrepancy module 160 described herein (see FIG. 1).

FIGS. 2C and 2D illustrate an example data flow, according to an example embodiment of the disclosure. Specifically, FIGS. 2C and 2D represent the system provider's perspective of the data flow which may utilize, for example, the comparative price utility module 154, the purchase order module 156, the savings module 158, and/or the discrepancy module 160 as described herein (see FIG. 1). More specifically, FIG. 2A represents the actions that may be completed by the service provider interface 240, and FIG. 2B represents the service provider administrator 250 utilizing the service provider computer(s) 140, in communication with the client device(s) 120 and the one or more vendor computer(s) 104A-104N via the network(s) 102. One of the tasks performed by the service provider administrator 250 may be to receive client information 251 and create account and send login to client 252. The service provider administrator 250 may login to system 253 (see FIG. 4). The service provider interface 240 may receive login and verify accuracy of login information 241. The system may verify whether a correct login 242 was received and if an incorrect login was provided, the system may transmit incorrect login to service provider administrator 250, and the service provider administrator 250 may receive login rejection 254, and the service provider administrator 250 may try again to login to service provider application 253 (see FIG. 4). If the correct login 242 was entered by the service provider administrator 250, the system may transmit home page and request to upload master 243.

Figure 2E:
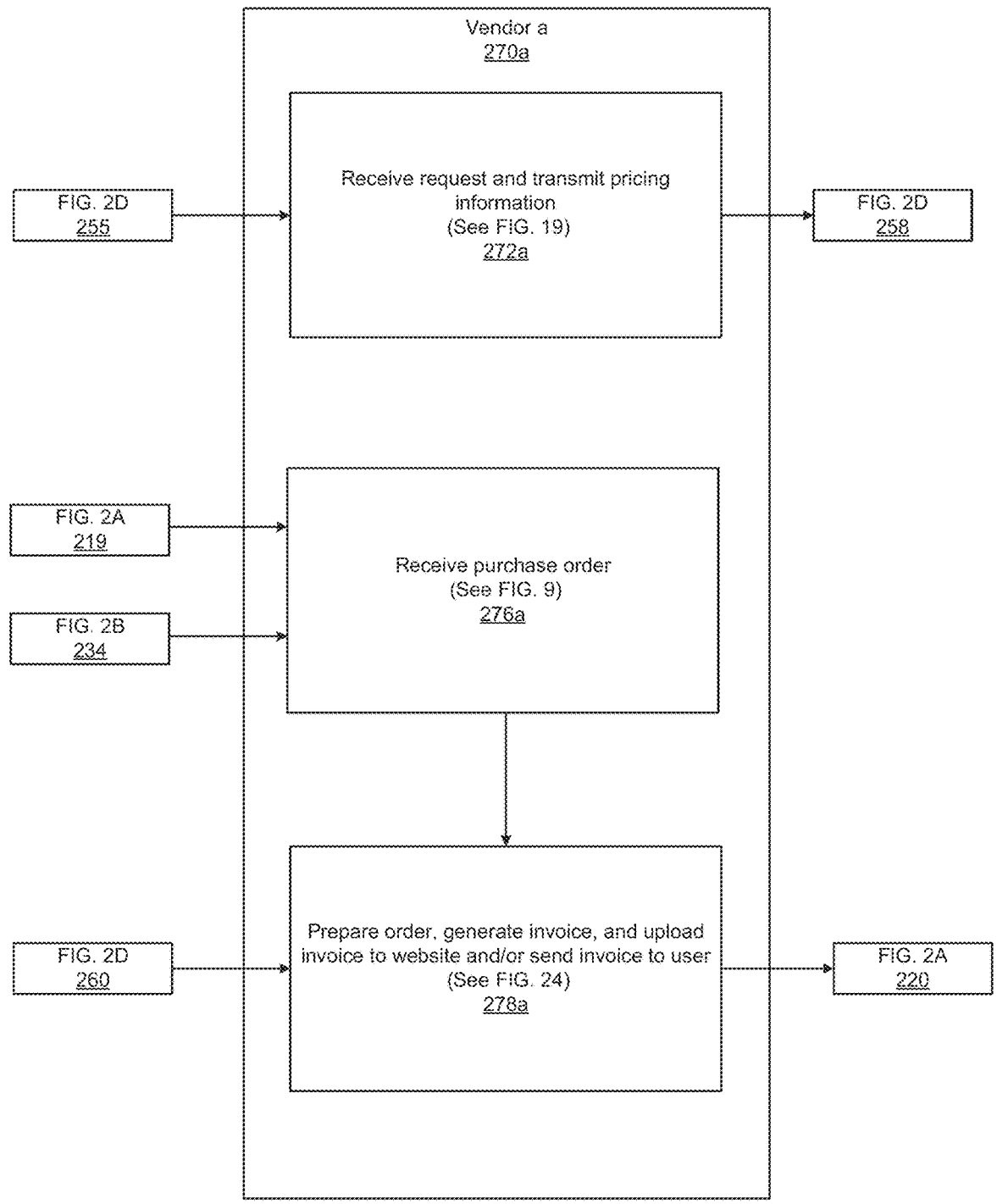
Figure 2F:
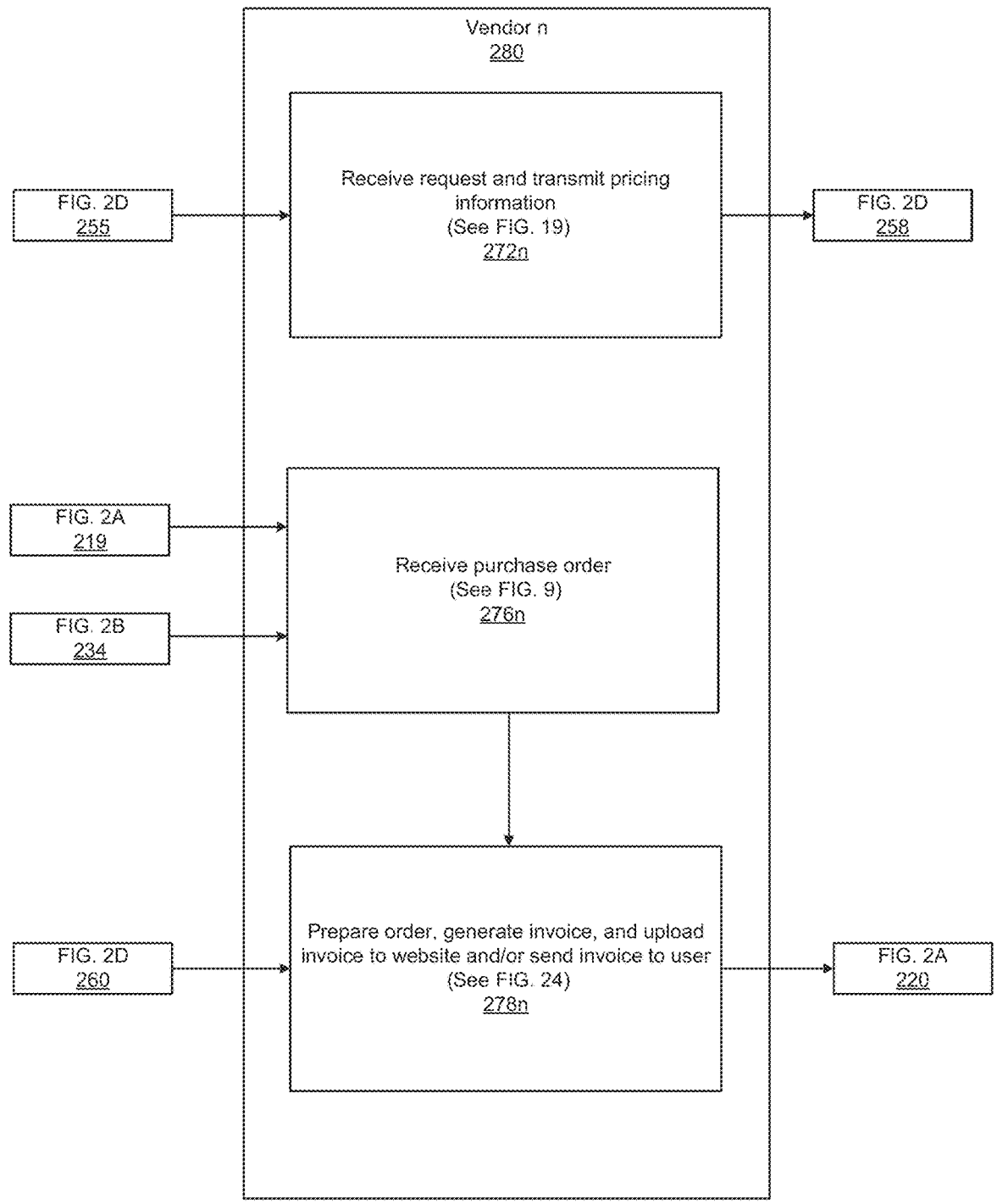

In certain embodiments of the disclosure, the service provider administrator 250 may send request to vendor(s) to import price data from vendors every set period of time (e.g. week, day, hour, etc.) 255 (see FIGS. 2E and 2F). Furthermore, in certain embodiments of the disclosure, the service provider administrator 250 may receive vendor data, determine equivalent items from vendors, and calculate conversion factor so that price per standard unit of measure is used for each item, and prepare document to upload for each vendor 258 (see FIGS. 20, 2E, and 2F). This process is further described for the comparative price utility module 154 (see FIG. 1).

Figure 10:
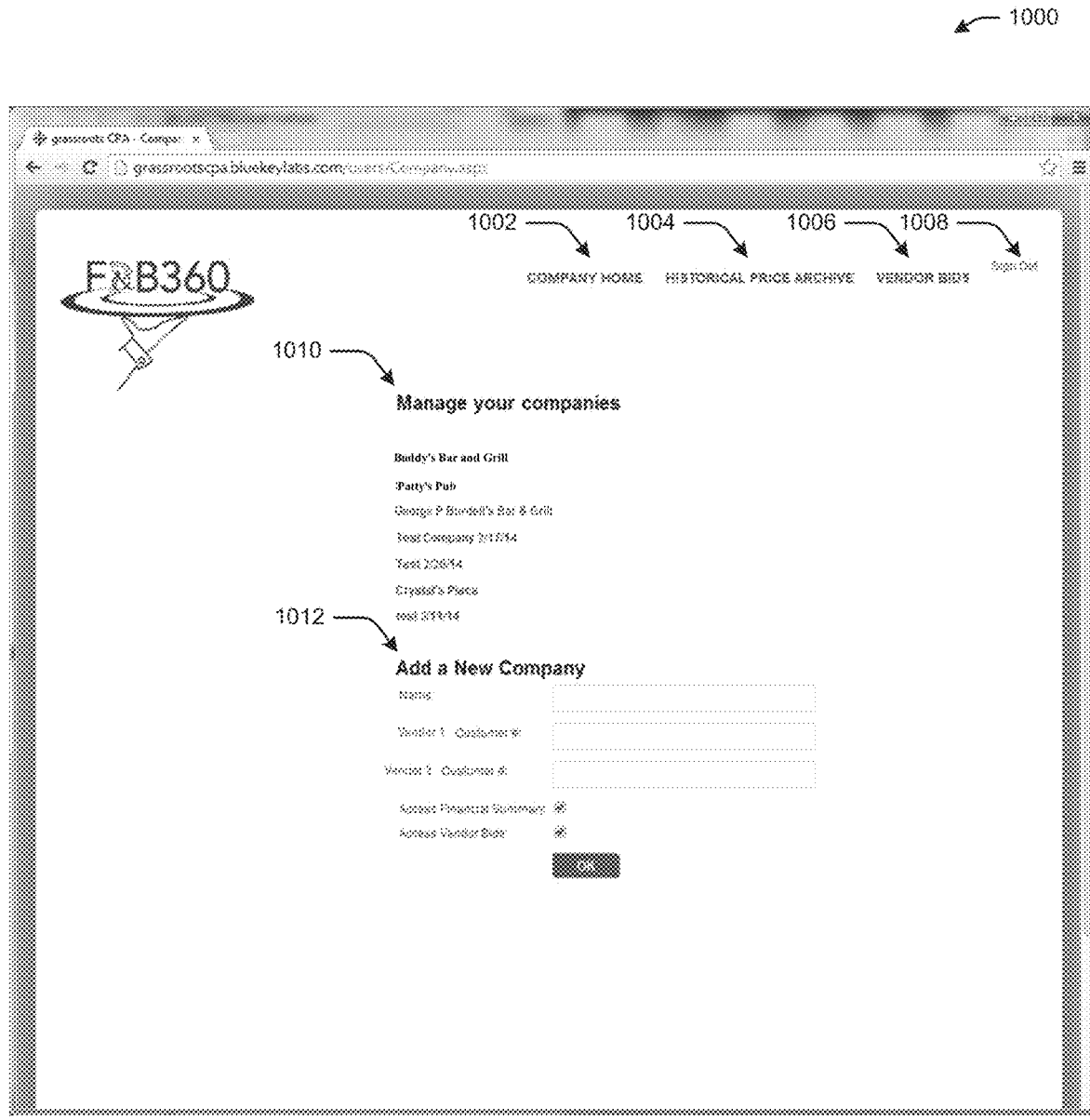

In certain embodiments of the disclosure, the service provider administrator 250 may receive home screen and choose vendor bids 256 (see FIG. 10). The service provider interface 240 may receive request for vendor bids and display vendor bids screen requesting choice of user 245 (see FIG. 11). The service provider administrator 250 may choose user and select archive pricing information 257 (see FIG. 11). Furthermore, in certain embodiments of the disclosure, the service provider interface 240 may generate request for new pricing 246 (see FIG. 12), and the service provider administrator 250 may upload current pricing information and conversion ratios 259 (see FIGS. 12-14 and 20). Additionally, in certain embodiments of the disclosure, the service provider interface 240 may receive vendor pricing, create updated vendor pricing list, archive previous vendor pricing, and provide current pricing upon request 247 to the user 210. The service provider interface 240 may then receive invoice and compare to pricing data that correlates to date of invoice, generate discrepancy report, archive and send to user and service provider administrator (see FIG. 25). The service provider administrator 250 may receive discrepancy report 263 (see FIG. 25).

In certain embodiments of the disclosure, the service provider administrator 250 may request/receive invoice from vendor(s) website or user and login to system 260 (see FIG. 24), where the vendor(s) are the one or more vendors 270A-270N. Then the service provider administrator 250 may receive home screen and choose invoice import 261 (see FIG. 21), and the service provider interface 240 may receive request for invoice import and display screen and choose customer 249 (see FIG. 21). Furthermore, in certain embodiments of the disclosure, the service provider administrator 250 may upload invoice and input date of invoice if necessary 262 (see FIGS. 22-24).

FIGS. 2E and 2F illustrate an example data flow, according to an example embodiment of the disclosure. Specifically, FIGS. 2E and 2F represent the one or more vendor(s) perspective of the data flow which may utilize, for example, the network(s) 102 to communicate with the user device(s) 120 and/or service provider computer(s) 140 described herein. In certain embodiments of the disclosure, the vendor a (FIG. 2E) and vendor n (FIG. 2F) represent the one or more vendors 270A-270N. The one or more vendors 270A-270N may receive request and transmit pricing information 272A-272N (see FIG. 19), receive purchase order 276A-276N (see FIG. 9), and prepare order, generate invoice, and upload invoice to website and/or send invoice to user 278A-278N (see FIG. 24).

The data flow 200 shown in, and described with respect to, FIG. 2 is provided by way of example only. Numerous other data flows, operating environments and components, system architectures, and device configurations are possible. Accordingly, embodiments of the disclosure should not be construed as being limited to any particular data flow, operating environment or component, system architecture, or device configuration.

Figure 3:
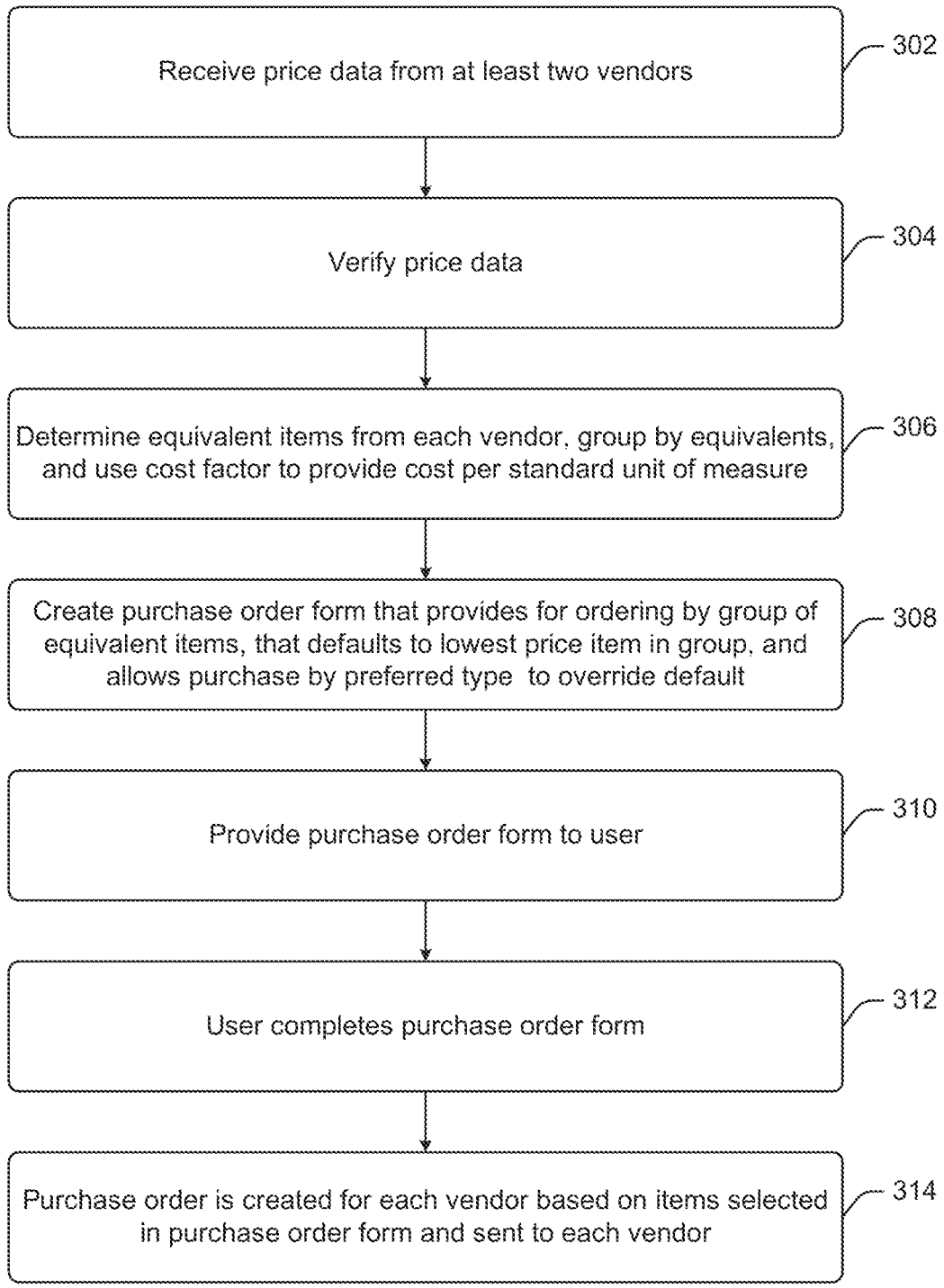
FIG. 3 illustrates an example flow diagram of a method according to an example embodiment of the disclosure.

FIG. 3 is a process flow diagram of an illustrative method 300 for providing comparative bid analysis and purchase order preparation in accordance with one or more example embodiments of the disclosure.

One or more operations of the method 300 may be described herein as being performed by the service provider computer(s) 140, or more specifically, one or more program modules executing on the service provider computer(s) 140 such as, for example, the comparative price utility module 154, the purchase order module 156, the savings module 158, and/or the discrepancy module 160. It should be appreciated, however, that any of the operations of the method 300 may be performed by another device or component of the system architecture 100 such as, for example, the user device(s) 120, or more specifically, the service provider application 128. In addition, it should be appreciated that processing performed in response to execution of computer-executable instructions provided as part of an application, program module, or the like (e.g., computer-executable instructions of the module(s) 154, 156, 158, and 160) may be interchangeably described herein as being performed by the application or the program module itself, by a device on which the application, program module, or the like is executing, or by a system that includes such a device. While the operations of the method 300 may be described in the context of the illustrative system architecture 100 and the illustrative data flow depicted in FIG. 2, it should be appreciated the method 300 may be implemented in connection with numerous other architectural and device level configurations.

The method 300 in FIG. 3 begins at block 302, in which the service provider computer(s) 140 or user device(s) 120 may receive, on behalf of a covered entity, price data from at least two vendors. Price data may be considered product code and customer-specific pricing, which can account for periodic fluctuations in price.

Block 302 is followed by block 304, in which the price data is verified, wherein the verification may be performed visually by the user using the user device(s) 120, or may be performed by the system 100, more specifically by the service provider application 128, or performed by the comparative price utility module 154 within the service provider computers(s) 140.

Block 304 is followed by block 306, in which equivalent items are determined from each vendor, group by equivalents, and use cost factors to provide cost per standard unit of measure. The equivalent item determination is described further herein in FIG. 2D, more specifically block 258.

Block 306 is followed by block 308, in which purchase order forms are created that provides for ordering by group of equivalent items, that defaults to lowest price item in the group, and allows purchase by preferred type to override default. In one example embodiment, the system may automatically default to the low price vendor when creating a purchase order. For example, if a customer prefers brand x from vendor one over brand y from vendor two, the customer can override the default in favor of the preferred brand, even though it is more expensive. The user may be prompted by the system default to order the lower cost product, but the user may have complete control over which products they order, The override function is a drop-down box in the "bid winner" column (See FIG. 7 described herein). The drop-down box may be modified to populate the purchase order with the like-kind product from any vendor. The purchase order creation is described further herein in FIG. 2, more specifically blocks 215-219, 230-234, 276 and 286.

Block 308 is followed by block 310, in which purchase order forms are provided to the user for review. The purchase order forms provided to the user is described further herein in FIG. 2, more specifically blocks 215-219 and 230-234.

Block 310 is followed by block 312, in which the user completes the purchase order form. Completing the purchase order forms by the user is described further herein in FIG. 2, more specifically blocks 215-219 and 230-234.

Block 312 is followed by block 314, in which the purchase order is created for each vendor based on items selected in purchase order form and sent to each vendor. Creating the purchase order and sending to one or more vendors is described further herein in FIG. 2, more specifically blocks 215-219, 230-234, 276 and 286.

In one aspect of an embodiment, the received price data from two or more vendors generates one or more indications for output to a user to verify some or all of the received price data, and based on the received price data, similar items from the two or more vendors is identified.

In one aspect of an embodiment, the similar items from the two or more vendors that is identified from the received price data is compared to determine a lowest price, and a proposed purchase order selecting the lowest price for some or all of the identified similar items is generated.

The method 300 may end after block 314.

Accordingly, the example method illustrated in FIG. 3 can facilitate comparative bid analysis and automated cross-reference of invoiced pricing to create purchase order(s) functionality to the user.

Figure 4:
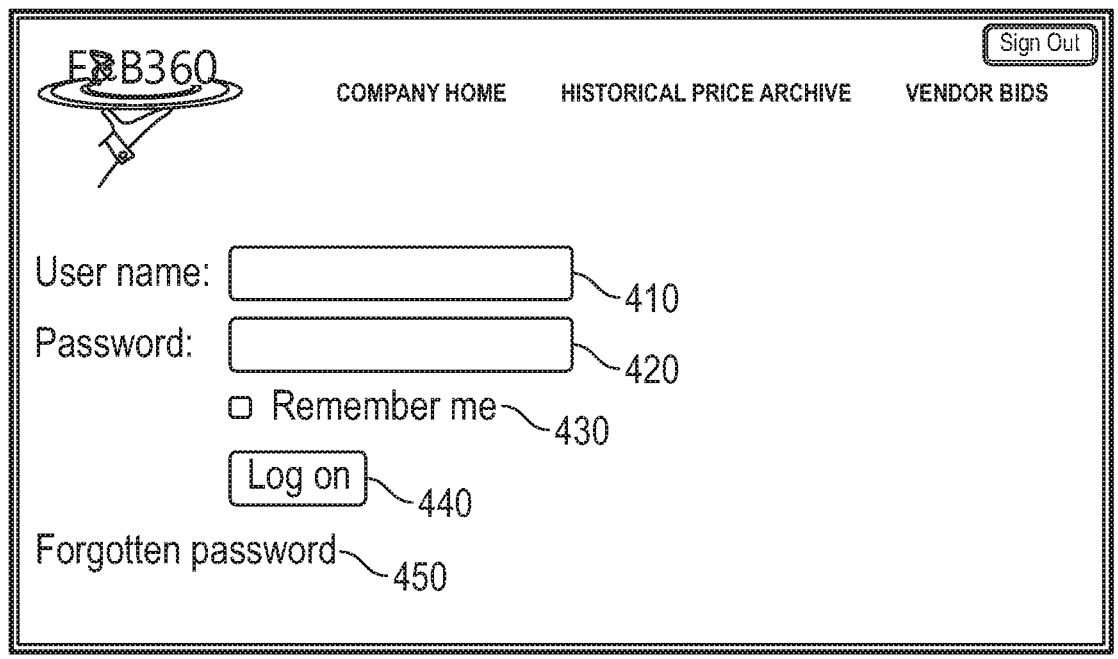

FIG. 4 shows a screenshot 400 of an exemplary login screen for authenticating an extended session for a third-party application on a web-based network. In this example, an output device, such as display 132 in FIG. 1 or a display monitor, can facilitate the display of a login screen as shown in screenshot 400. Here, the third-party application is titled "F&B 360." As shown in screenshot 400, a user may employ the exemplary login screen to enjoy the full functionality of a third-party application by allowing it to communicate data with a web-based network. Existing users can log in using the "Log on" (440) icon by first entering their information into the username (410) and password (420) data entry fields. Also shown in the screenshot 400 is the ability for an existing user to either access the forgotten password process 450 or may use the "remember me" indicator 430 to allow a user to skip through typing in the user name and/or password.

Figure 5:
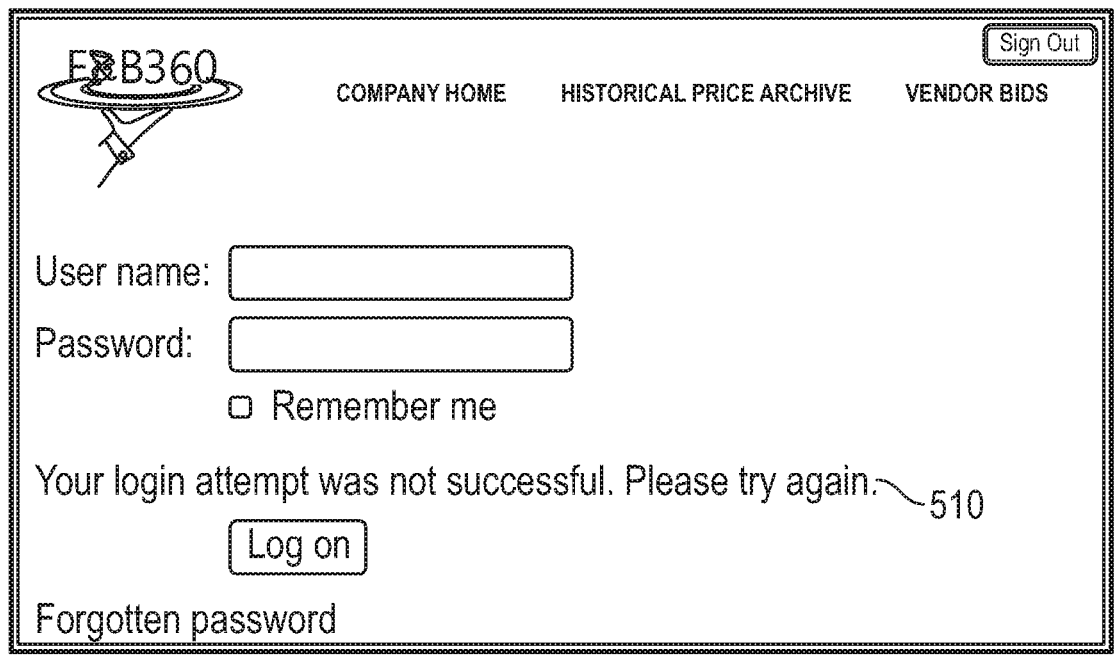

FIG. 5 shows a screenshot 500 of an exemplary login screen for authenticating an extended session for a third-party application on a web-based network similar to screenshot 400 in FIG. 4. In this example, an output device, such as display 132 in FIG. 1 or a display monitor, can facilitate the display of a login screen as shown in screenshot 500. Here, if the user enters an incorrect user name and/or password, the system displays: "Your login attempt was not successful. Please try again." 510. The user may attempt to reenter the username and password correctly.

Figure 6:
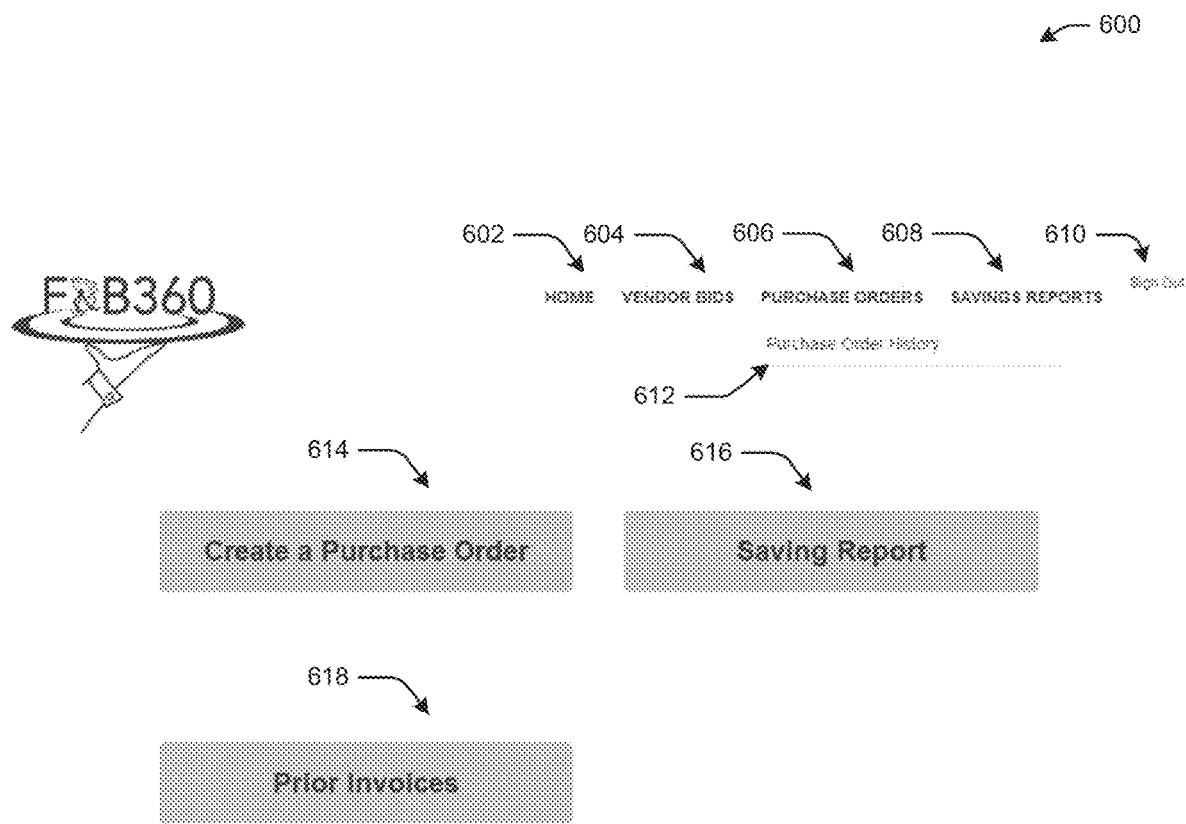

FIG. 6 shows a screenshot 600 of a typical home screen for a third-party application on a web-based network. In this example, an output device, such as display 132 in FIG. 1 or a display monitor, can facilitate the display of a home screen as shown in screenshot 600. Here, the third-party application home screen is titled "F&B 360." As shown in screenshot 600, a user can access several aspects of the system and method described herein. For example, via the top row of icons visible on most screens in the system, the user may access and return to this home screen utilizing the "HOME" icon 602, the user may access all vendor bids utilizing the "VENDOR BIDS" icon 604, all purchase orders utilizing the "PURCHASE ORDERS" icon 606, all savings reports utilizing the "SAVINGS REPORTS" icon 608, and the user may log out of the secure system by utilizing the "Sign Out" icon 610. Users may also access older purchase orders directly by selecting the purchase order number in the purchase order history 612 field which may list all existing purchase orders with a link to the purchase order. Also shown in the screenshot 600 is the ability to access the main functions of the method and system as described herein. For example, the user may select the "Create a Purchase Order" icon 614 to enable users to input the product needs and generate purchase orders from one or more vendors. The user may select the "Saving Report" icon 616 to enable the user to create reports displaying the savings created using the system. The user may select the "Prior Invoices" icon 618 to enable the user to view all prior invoices collected by the system.

FIG. 7 shows a screenshot 700 of a user interface produced by the system. In this example, an output device, such as display 132 in FIG. 1 or a display monitor, can facilitate the display of the user interface as shown in screenshot 700. Here, the vendor/product comparison table 710 displays all of the items that match the users order guide data for the weekly price list. The user may select the "Next" icon 720 to enable the user to transmit the preferred vendor for each item selected as indicated in the "Bid Winner" column of the vendor/product comparison table 710. In one embodiment, the system has the ability to populate the pricing information periodically, as shown in screenshot 700 when pricing information is imported, e.g. screenshot 1900 (See FIG. 19 described herein). The information is stored in the database 162 (product description, quantity, unit of measurement, manufacturer, etc.) as it relates to the respective product code and is populated and shown to the user on the user interface, screenshot 700.

FIG. 8 shows a screenshot 800 of a user interface produced by the system. In this example, an output device, such as display 132 in FIG. 1 or a display monitor, can facilitate the display of the user interface as shown in screenshot 800. Here, the quantity selection table 810 displays all of the items the user selected as the bid winners and enables the user to enter the quantity of each product they desire to order from the respective vendor selected as the bid winner. The user may confirm the selection and select the "Submit Order" icon 830 if no changes are needed in the quantities, or the user may modify the quantities and select the "Save and Calculate" icon 820 to enable the user to recalculate the savings based on the new quantities selected.

Figure 9A:
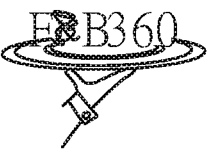
Figure 9B:
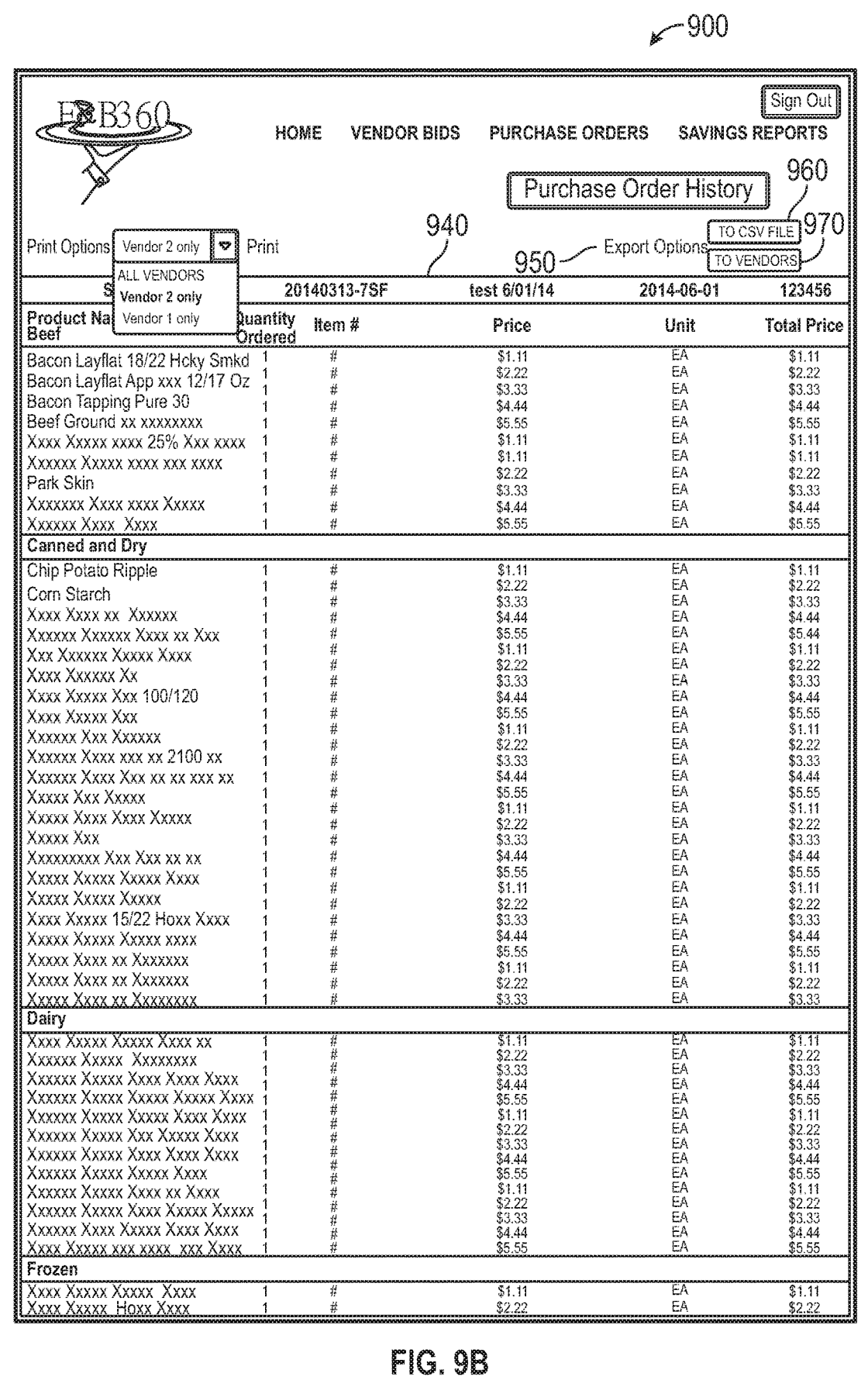

FIGS. 9A and 9B show screenshots 900 of a user interface produced by the system. In these examples, an output device, such as display 132 in FIG. 1 or a display monitor, can facilitate the display of the user interface as shown in screenshots 900. Here, the purchase order confirmation images 920, 930, and 940 display all of the items the user selected for each respective bid winners and enables the user to send the final purchase order to the one or more vendors selected. The user may select the "Print" icon 910 to enable the user to print each purchase order created. The user may select the drop down menu to choose to print each vendor separately as displayed in FIG. 9B, or print all purchase orders for each vendor by selecting "ALL VENDORS" as displayed in FIG. 9A. The user may also select two export options 950 for the purchase order(s): "TO CSV FILE" 960 to convert the purchase order(s) to CSV format, or the user may select "TO VENDORS" 970 to send the purchase order(s) to one vendor or all vendors as selected in the drop down menu.

FIG. 10 shows a screenshot 1000 of a service provider administrator's interface produced by the system. In this example, an output device, such as display 146 in FIG. 1 or a display monitor, can facilitate the display of the service provider administrator interface as shown in screenshot 1000. Here, the service provider administrator's home screen is titled "F&B 360." As shown in screenshot 1000, an administrator can access several aspects of the system and method described herein. For example, via the top row of icons visible, the administrator may access and return to this home screen utilizing the "COMPANY HOME" icon 1002, the administrator may access all historical pricing utilizing the "HISTORICAL PRICE ARCHIVE" icon 1004, all vendor bids utilizing the "VENDOR BIDS" icon 1006, and the administrator may log out of the secure system by utilizing the "Sign Out" icon 1008. Also shown in the screenshot 1000 is the administrator's ability to access the main functions of a method and system as described herein. For example, the administrator may select the "Manage your companies" icon 1010 to modify the existing users (customers/users) in the database 162. The administrator may select the "Add a New Company" icon 1012 to enable the administrator to create a new customer. For example, the administrator, as shown in screenshot 1000, may add a new restaurant as a customer that is currently a US Foods and SYSCO customer by entering their respective "Customer #" in the corresponding data entry fields under the "Add a New Company" icon 1012. The service provider administrator interface as shown in screenshot 1000 may also allow the administrator to access vendor bids as described in block 256.

FIG. 11 shows a screenshot 1100 of a service provider administrator's interface produced by the system. In this example, an output device, such as display 146 in FIG. 1 or a display monitor, can facilitate the display of the service provider administrator's interface as shown in screenshot 1100. Here, as shown in screenshot 1100, an administrator can begin the process of selecting a user, selecting the time period in order to make the historical price archive cross-reference the price lists accordingly, and archive their current pricing by selecting the "Archive Current Pricing" icon 1102. The service provider administrator interface as shown in screenshot 1100 may allow the administrator to access all companies in the system as described in block 257. In one embodiment, for example, the administrator selects the user for whom they are importing current pricing for the products on the user's order guide (approximately 100-150 preselected products chosen by the user when they sign up as users with the service provider).

FIG. 12 shows a screenshot 1200 of a service provider administrator's interface produced by the system. In this example, an output device, such as display 146 in FIG. 1 or a display monitor, can facilitate the display of the service provider administrator's interface as shown in screenshot 1200. Here, as shown in screenshot 1200, an administrator, after selecting a user from step one as shown in FIG. 11, step two is initiated: importing a vendor's price data. For example, in the restaurant industry, screenshot 1200 displays importing from a first vendor, USFoods. To import the price data, the service provider administrator may select the "Choose File" icon 1202, select the price data file that was received from the vendor selected, and select the "Import" icon 1204 to start the process. The service provider administrator interface as shown in screenshot 1200 may allow the administrator to import price data from any vendor as needed by the user for a given time period, as described in block 259. In one embodiment, for example, the file imported may be a comma separated value ("CSV") formatted file, where the first column is the product number, and the second column of data is the price. For an example of the CSV file, see FIG. 20 as described herein.

Figure 13:
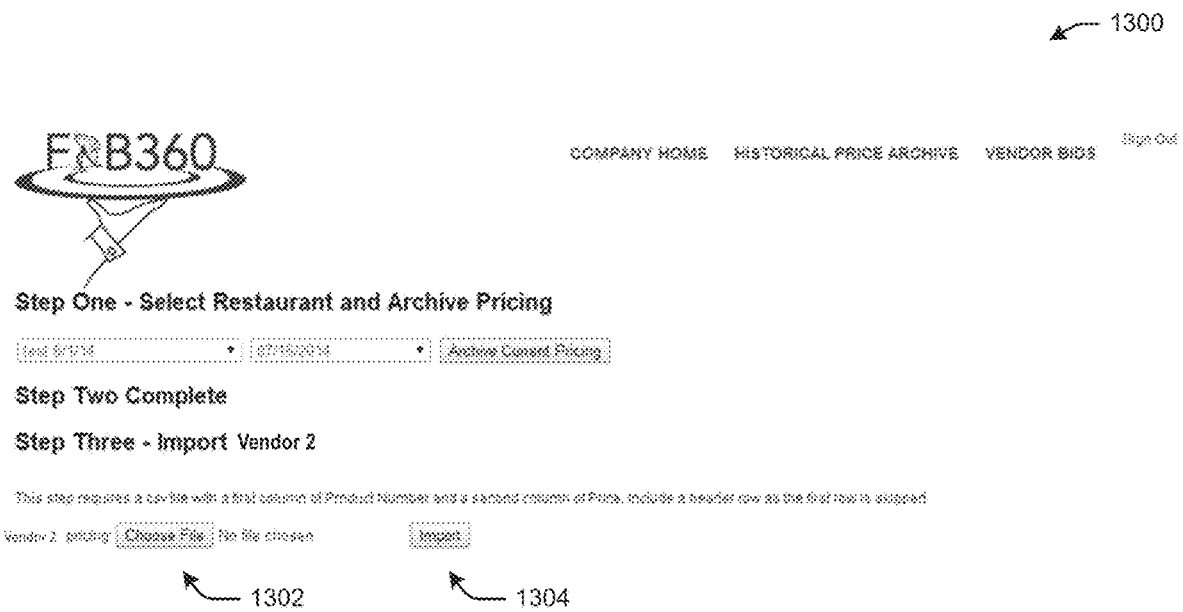

FIG. 13 shows a screenshot 1300 of a service provider administrator's interface produced by the system. In this example, an output device, such as display 146 in FIG. 1 or a display monitor, can facilitate the display of the service provider administrator's interface as shown in screenshot 1300. Here, as shown in screenshot 1300, an administrator, after selecting a first vendor from step two as shown in FIG. 12, step three is initiated: importing a second vendor's price data. For example, in the restaurant industry, screenshot 1300 displays importing from a second vendor, SYSCO. To import the price data, the service provider administrator may select the "Choose File" icon 1302, select the price data file that was received from the vendor selected, and select the "Import" icon 1304 to start the process. The service provider administrator interface as shown in screenshot 1300 may allow the administrator to import price data from any vendor as needed by the user for a given time period, as described in block 259. In one embodiment, for example, the file imported may be a comma separated value ("CSV") formatted file, where the first column is the product number, and the second column of data is the price. For an example of the CSV file, see FIG. 20 as described herein.

FIGS. 14A and 14B show screenshots 1400 of a service provider administrator's interface produced by the system. In this example, an output device, such as display 146 in FIG. 1 or a display monitor, can facilitate the display of the service provider administrator's interface as shown in screenshots 1400. Here, screenshots 1400 are displayed to the administrator after the steps are completed and similar products for each vendor have been matched in the database to create equivalent items, as described in FIG. 3 herein. In one embodiment, as displayed in FIG. 14B for example, step four is skipped because the program may display when the system recognizes all the matches on the users order guide (this may be common for existing users), and the program may indicate this as, "Step Four Skipped—Matching Not Needed" 1410. In another embodiment, for example, if the products were not already matched, the system would require an additional step, e.g. "Step Four," to match similar items and calculate conversion ratios, as described in block 258, FIG. 20, and FIG. 27 herein.

Figure 15:
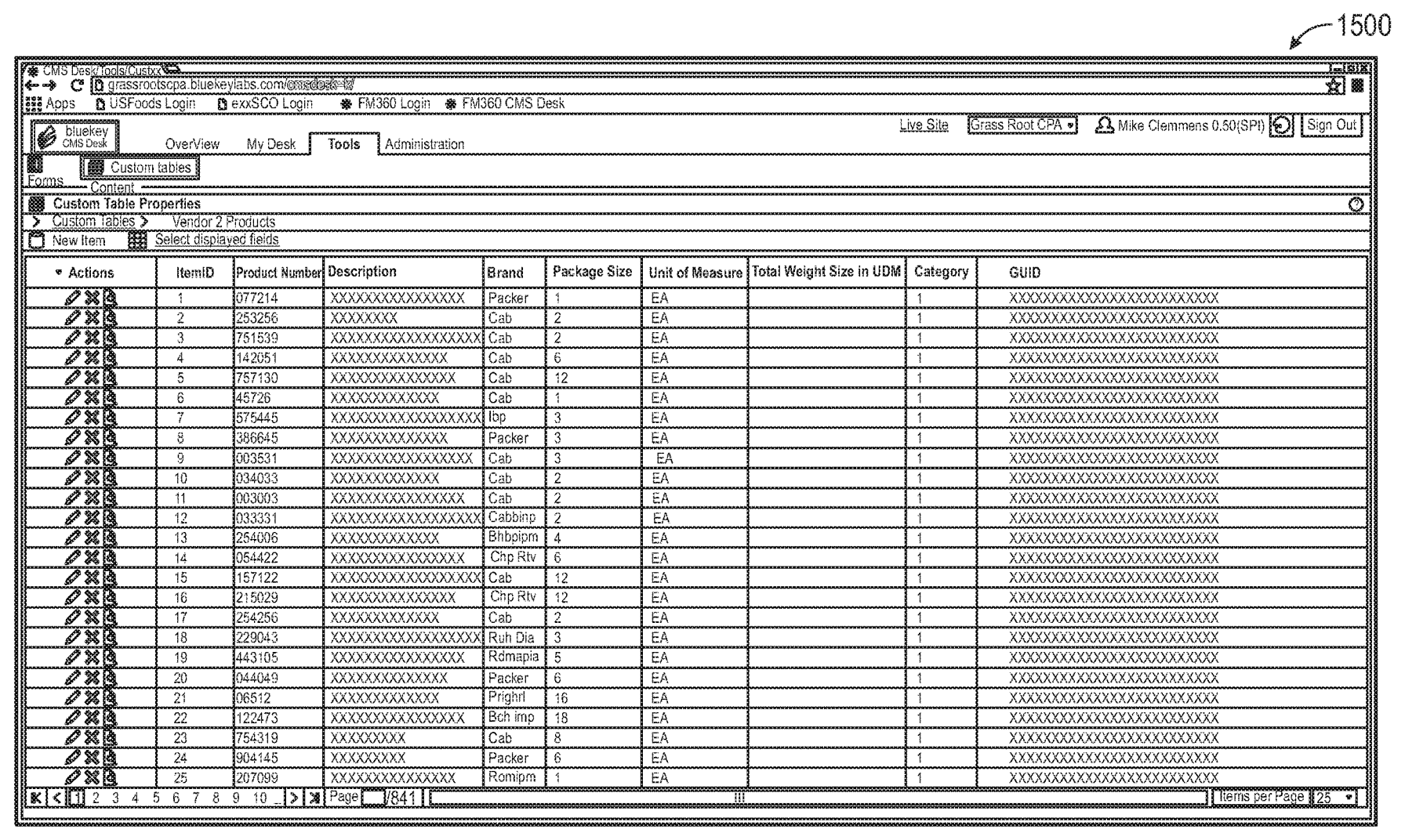
Figure 16:
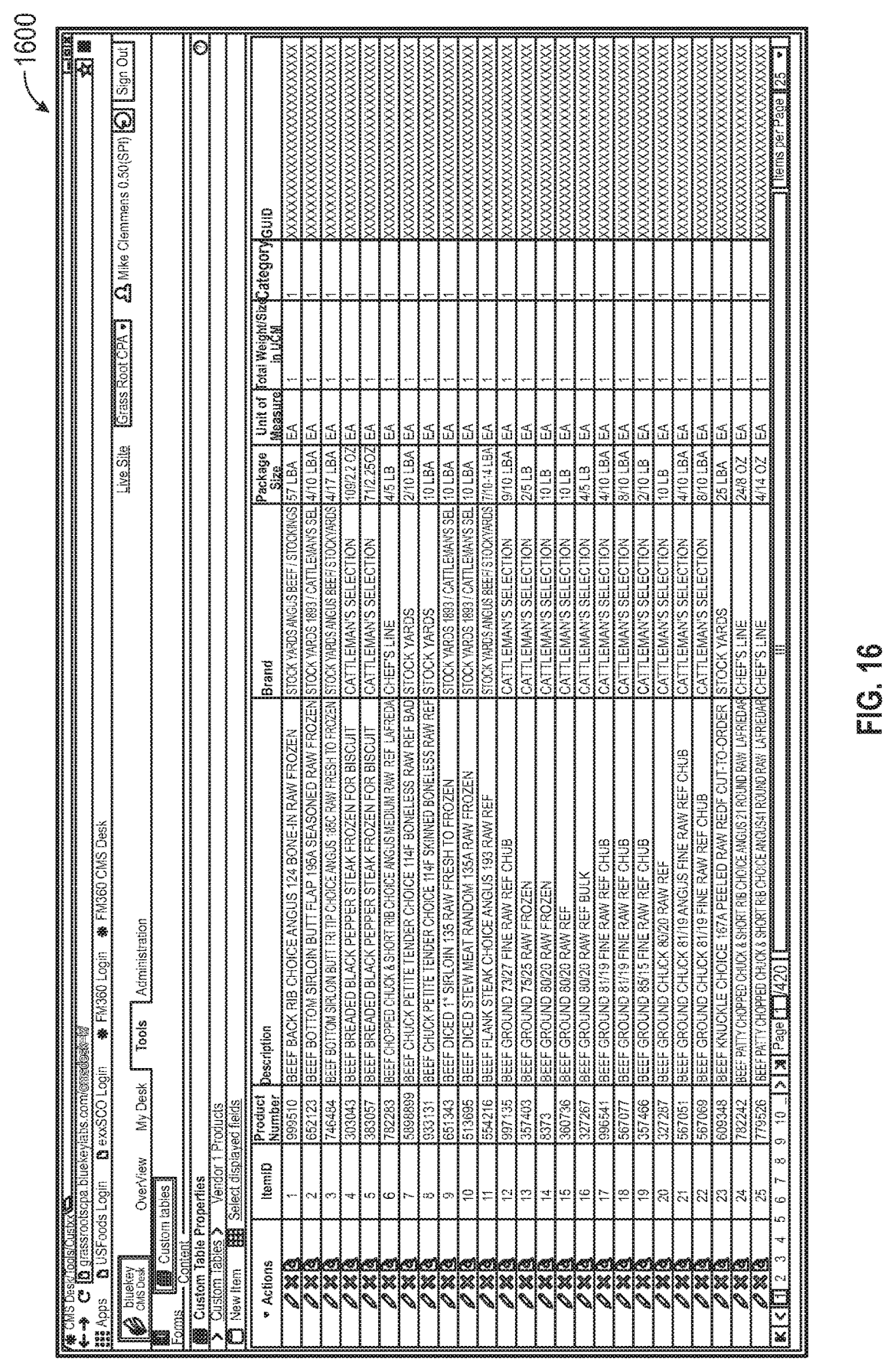

FIGS. 15 and 16 show screenshots 1500 and 1600 of a service provider administrator's interface produced by the system. In this example, an output device, such as display 146 in FIG. 1 or a display monitor, can facilitate the display of the service provider administrator's interface as shown in screenshots 1500 and 1600. Here, screenshots 1500 and 1600 are views of the database which may contain every known product offered by each vendor shown individually. The database(s) includes the vendor's product identifying number, each product's description, brand (manufacturer), pack size, unit of measurement, and product category. In one embodiment, for example, the databases in FIG. 15 and FIG. 16 are stored independently of each other, and they are not combined until the matches are imported (See FIG. 20 described herein). Once product codes are matched, they are stored in the database(s) as matched products (See FIG. 17 described herein); therefore, the next time any user's order guide contains the same product code from either vendor, the matched products already exist in the database.

Figure 17:
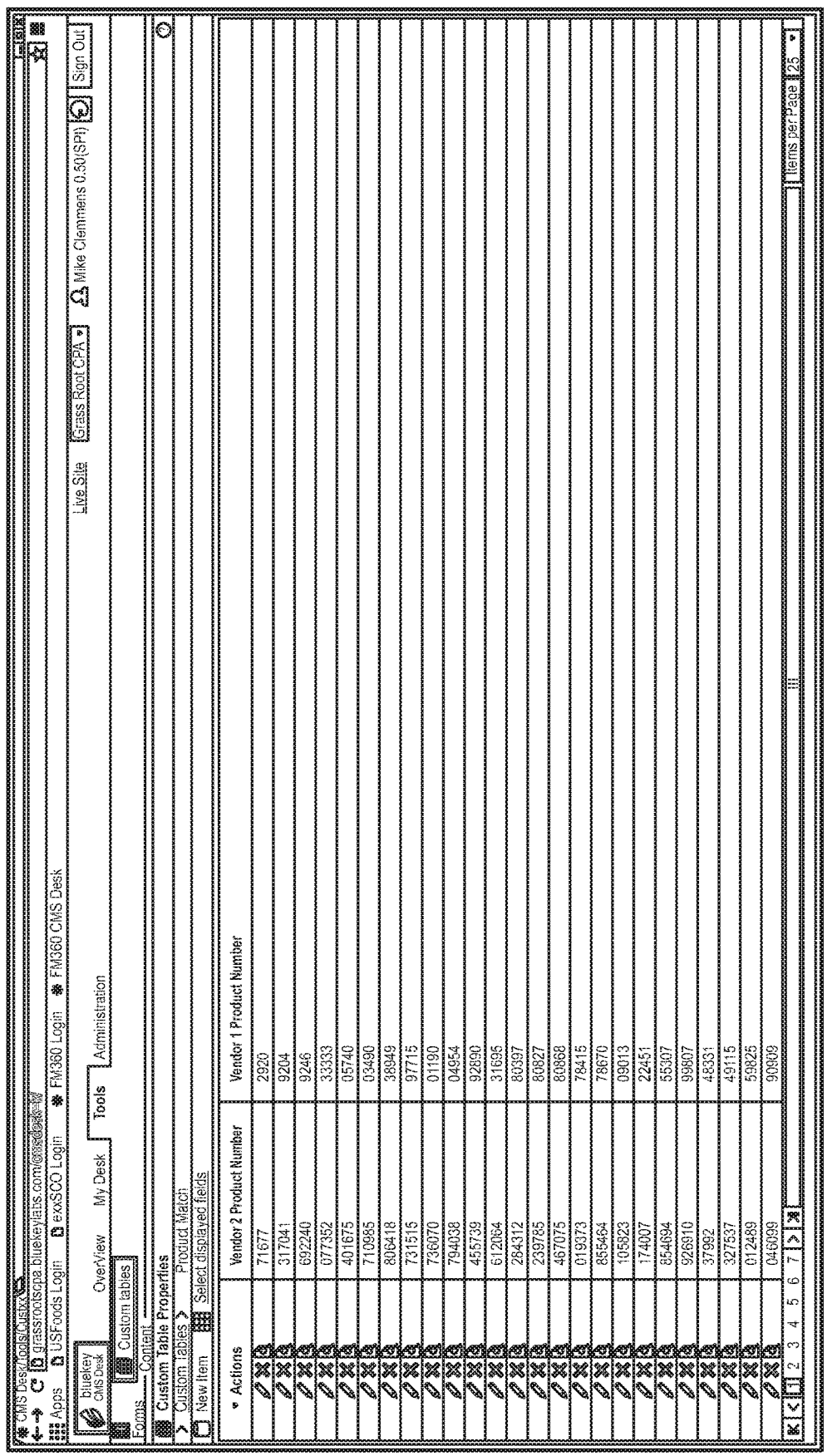

FIG. 17 shows a screenshot 1700 of a service provider administrator's interface produced by the system. In this example, an output device, such as display 146 in FIG. 1 or a display monitor, can facilitate the display of the service provider administrator's interface as shown in screenshot 1700. Here, screenshot 1700 is a view of the database of matched products. As described in an example embodiment for FIG. 16, the next time a user uses the same product code from either vendor, the matched products already exist in the database as shown in screenshot 1700.

Figure 18:
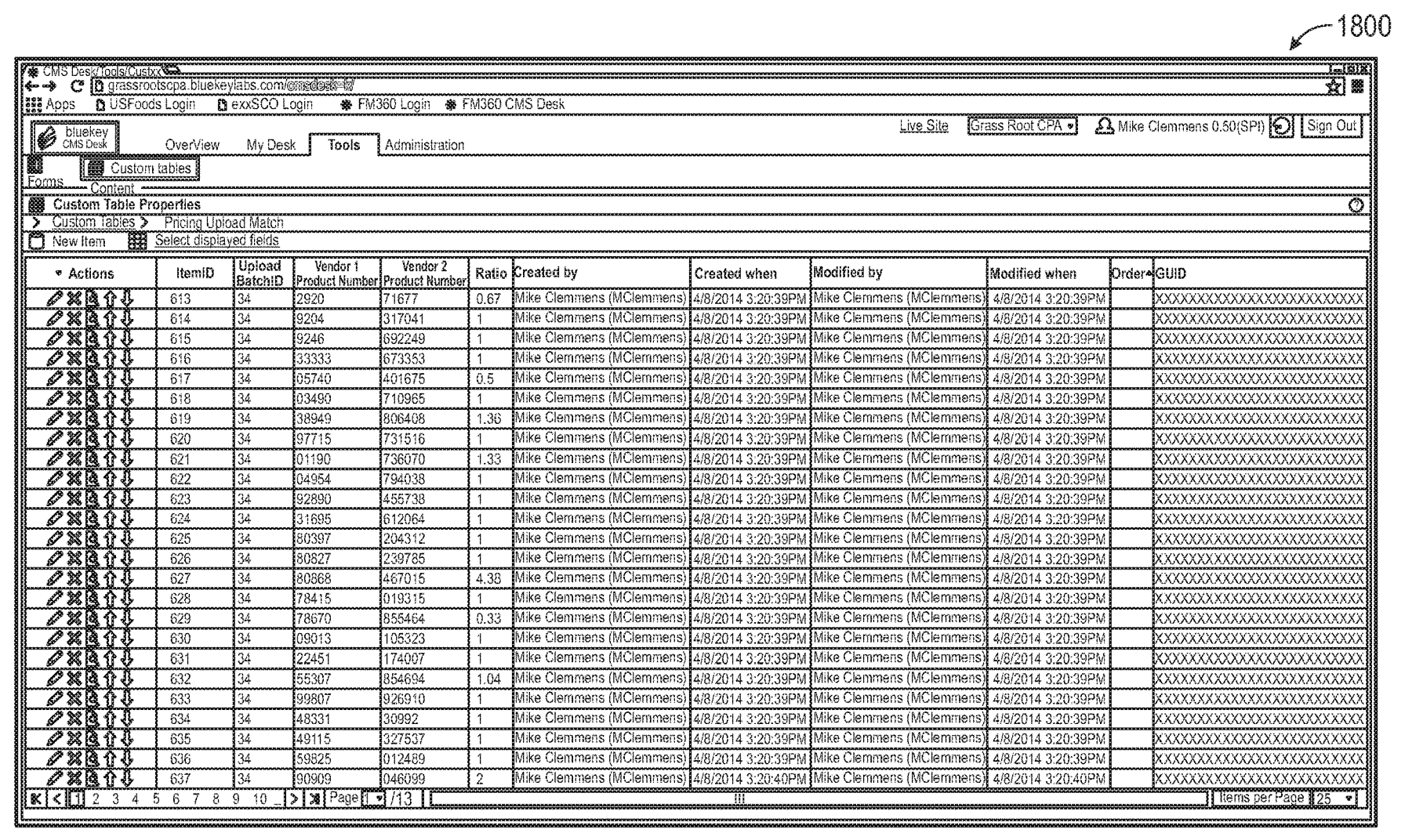

FIG. 18 shows a screenshot 1800 of a service provider administrator's interface produced by the system. In this example, an output device, such as display 146 in FIG. 1 or a display monitor, can facilitate the display of the service provider administrator's interface as shown in screenshot 1800. Here, screenshot 1800 is a view of the database of each upload batch, where the data is stored and adjusted with the conversion ratio as described herein in block 258 and FIG. 20.

FIG. 19 shows a screenshot 1900 of a service provider administrator's interface produced by the system. In this example, an output device, such as display 146 in FIG. 1 or a display monitor, can facilitate the display of the service provider administrator's interface as shown in screenshot 1900. Here, screenshot 1900 displays an example weekly price list from a vendor which is needed from each vendor to populate the vendor/product comparison table 710, which is the side-by-side order guide as shown in FIG. 7.

Figure 20:
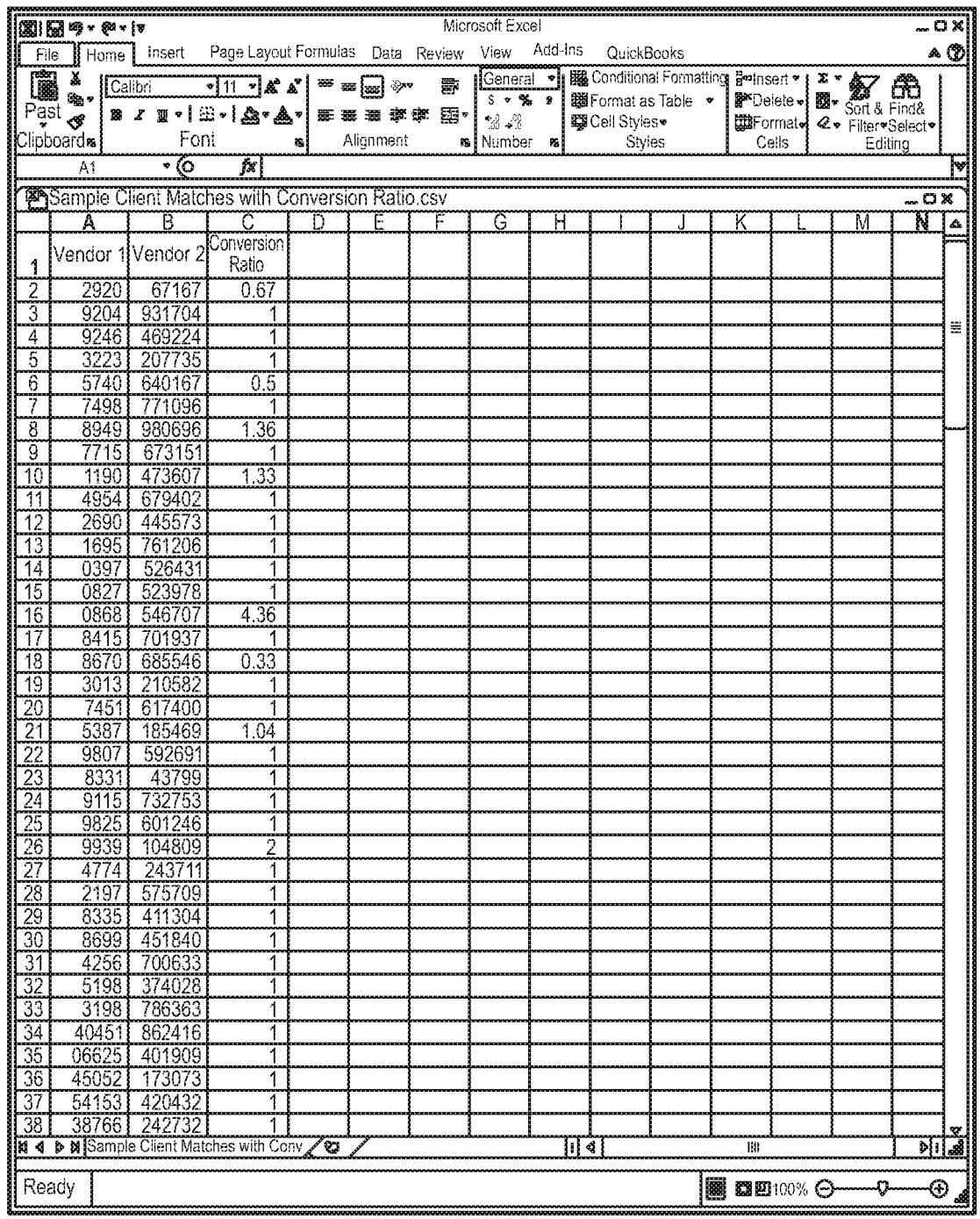

FIG. 20 shows a screenshot 2000 of a service provider administrator's interface produced by the system. In this example, an output device, such as display 146 in FIG. 1 or a display monitor, can facilitate the display of the service provider administrator's interface as shown in screenshot 2000. Here, screenshot 2000 displays what the administrator imports once product matches are found and conversation ratios are manually calculated. Once imported, the database(s) in FIGS. 17 and 18 are updated accordingly with the new product matches.

Figure 21:
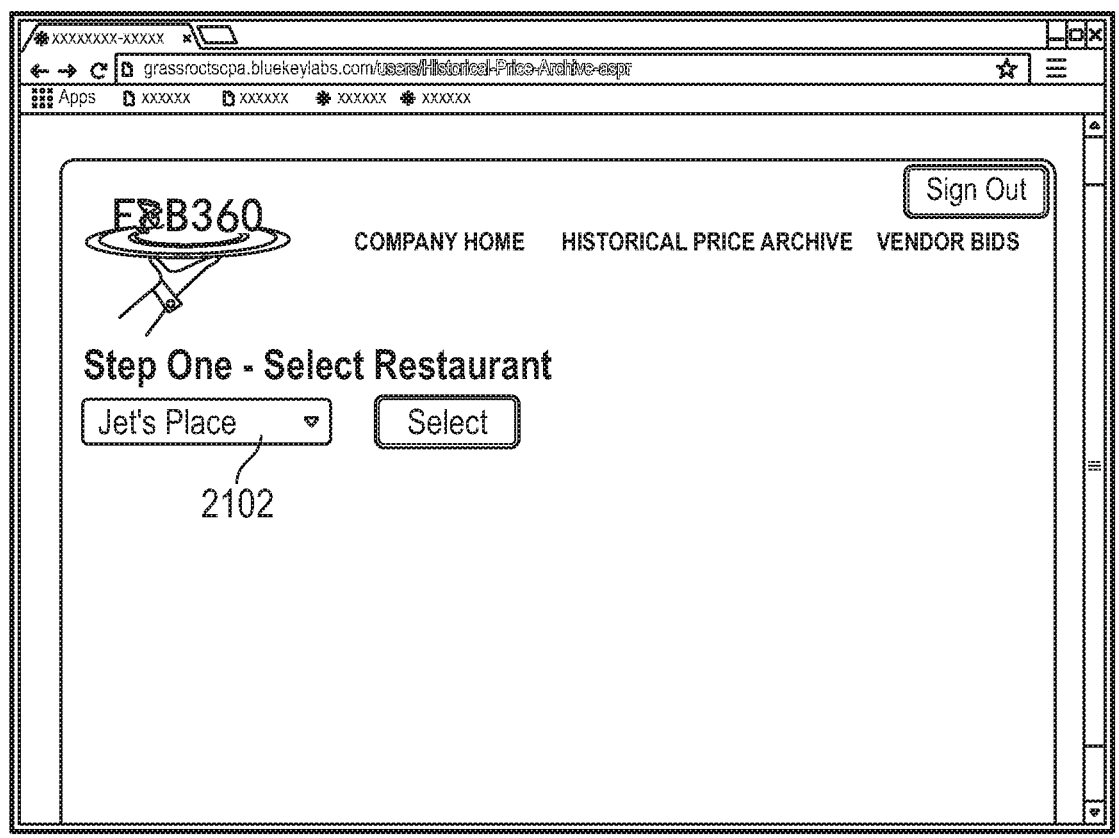

FIG. 21 shows a screenshot 2100 of a service provider administrator's interface produced by the system. In this example, an output device, such as display 146 in FIG. 1 or a display monitor, can facilitate the display of the service provider administrator's interface as shown in screenshot 2100. Here, as shown in screenshot 2100, an administrator can begin the process of selecting a user to import an invoice generated by one of the vendors by choosing the user from the drop down menu and selecting the "Select" icon 2102. The service provider administrator interface as shown in screenshot 2100 may allow the administrator to access all companies in the system as described in block 261.

Figure 22:
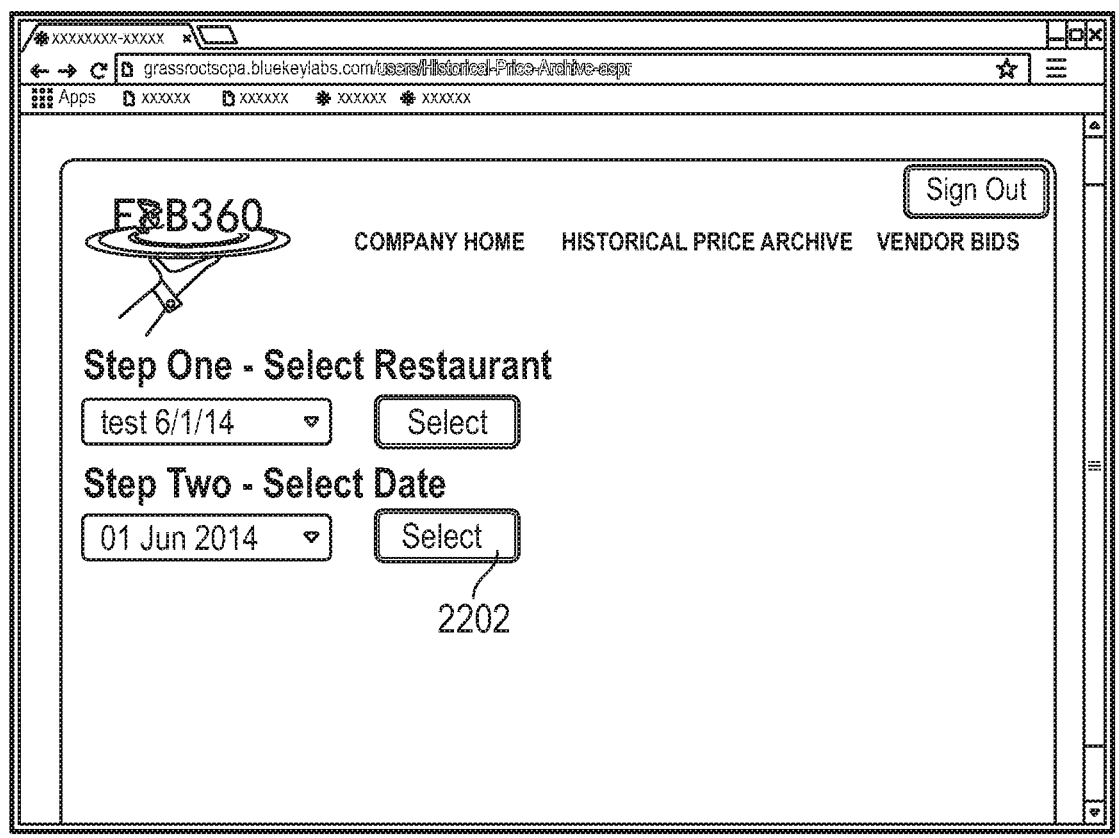

FIG. 22 shows a screenshot 2200 of a service provider administrator's interface produced by the system. In this example, an output device, such as display 146 in FIG. 1 or a display monitor, can facilitate the display of the service provider administrator's interface as shown in screenshot

2200. Here, as shown in screenshot 2200, an administrator, after selecting a user from step one as shown in FIG. 21, step two is initiated: selecting the date of the invoice. To choose the date of the invoice, the service provider administrator may select the "Select" icon 2202, and choose the date accordingly as described in block 262. In one example embodiment, by choosing the date on the invoice, the selection will automatically require that the invoiced prices be cross-referenced against the historical pricing archived for the time period in which the invoice date falls as described in block 248.

Figure 23:
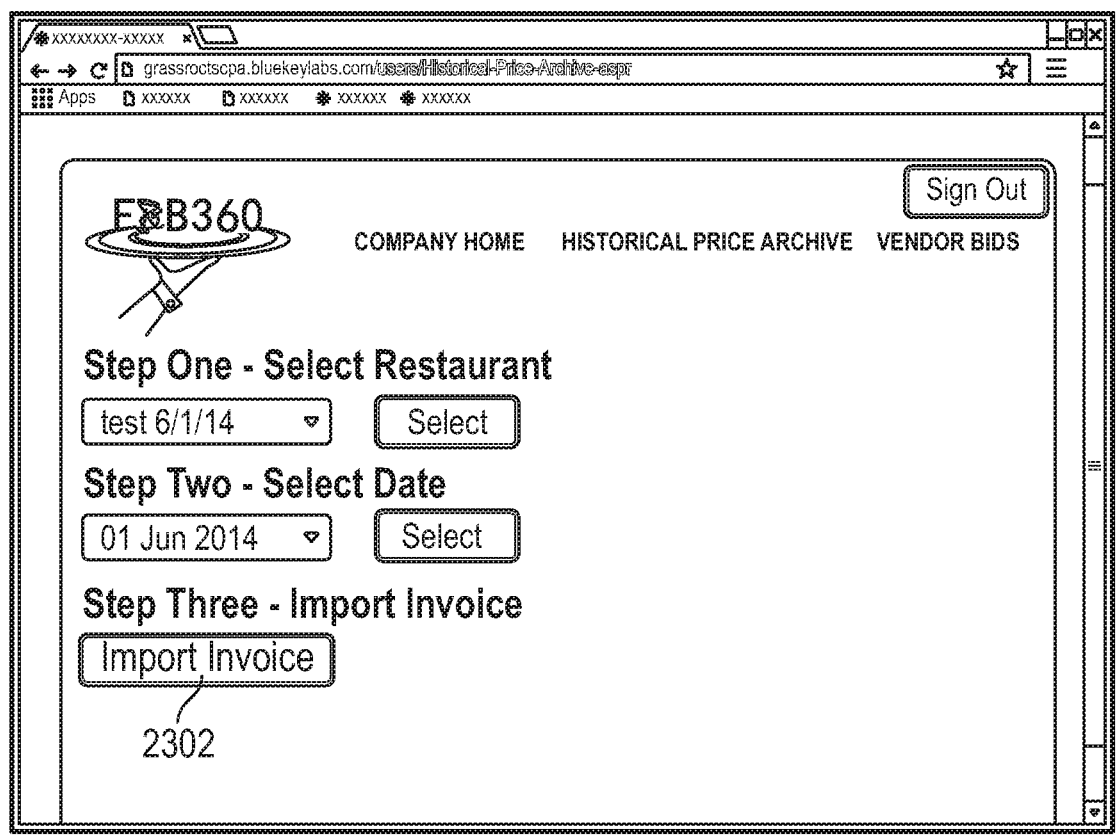

FIG. 23 shows a screenshot 2300 of a service provider administrator's interface produced by the system. In this example, an output device, such as display 146 in FIG. 1 or a display monitor, can facilitate the display of the service provider administrator's interface as shown in screenshot 2300. Here, as shown in screenshot 2300, an administrator, after selecting an invoice date from step two as shown in FIG. 22, step three is initiated: importing an invoice. To import the invoice, the service provider administrator may select the "Import Invoice" icon 2302, select the invoice file associated with the vendor accordingly as shown in screenshot 2400 in FIG. 24.

FIG. 24 shows a screenshot 2400 of a service provider administrator's interface produced by the system. In this example, an output device, such as display 146 in FIG. 1 or a display monitor, can facilitate the display of the service provider administrator's interface as shown in screenshot 2400. Here, screenshot 2400 is a view of an example invoice from a vendor in CSV format, as further described herein in block 260.

Figure 25:
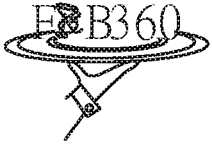

FIG. 25 shows a screenshot 2500 of a user interface produced by the system. In this example, an output device, such as display 132 in FIG. 1 or a display monitor, can facilitate the display of the interface as shown in screenshot 2500. Here, screenshot 2500 is a view of an example savings report 2510, which shows the user the savings achieved over each vendor, by using the program as described herein with the savings module 158. In an example embodiment, the price comparison savings are achieved by price shopping like-kind products between two or more vendors, and ordering the low cost item.

Figure 26:
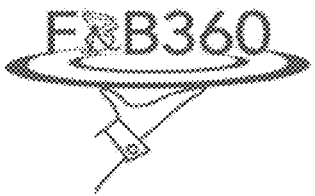

FIG. 26 shows a screenshot 2600 of a user and/or a service provider administrator's interface produced by the system. In this example, an output device, such as display 132 and display 146 in FIG. 1, or a display monitor, can facilitate the display of the interface as shown in screenshot 2600. Here, screenshot 2600 is a view of an example discrepancy report which compares the quoted price for each product with the invoiced price for each product, and calculates the price discrepancy accordingly. In one embodiment, for example, the service provider administrator will relay this report to the user, allowing the user to short-pay the invoice for any discrepancy in pricing as described with the discrepancy module 160 herein. In another embodiment, the discrepancy report is automatically sent to the user.

FIG. 27 shows a screenshot 2700 of a service provider administrator's interface produced by the system. In this example, an output device, such as display 146 in FIG. 1 or a display monitor, can facilitate the display of the service provider administrator's interface as shown in screenshot 2700. Here, as shown in screenshot 2700, an administrator, after importing the price data from a vendor from step three as shown in FIG. 13, step four may be initiated when products are not all already matched (for a new user, for example), and the user will import the data to the system by selecting the "Choose File" icon 2710 to choose the price data file in CSV format to be matched between the two or more vendors, and the user may select the "Import" icon 2720 to begin step four and the system will match the like-kind products and conversion ratios as described in block 258.

Embodiments of the disclosure are described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It will also be appreciated that each of the I/O interfaces described herein may facilitate communication between a processor and various I/O devices, such as a keyboard, mouse, printer, microphone, speaker, monitor, bar code readers/scanners, RFID readers, and the like. Likewise, each of the network interfaces described herein may take any of a number of forms, such as a network interface card, a modem, a wireless network card, and the like.

It will further be appreciated that while certain computers have been illustrated herein as a single computer or processor, the illustrated computers may actually be comprised of a group of computers or processors, according to an example embodiment of the disclosure.

Many modifications and other embodiments of the disclosure will come to mind to one skilled in the art to which this disclosure pertains and having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The claimed disclosure is:

1. A computer-implemented method comprising:
receiving and importing, by one or more computer processors, price data within a comma separated value formatted file from two or more restaurant vendors on behalf of a restaurant user, wherein the price data is automatically stored in an historical price archive;
based at least in part on the received price data, generating, by the one or more computer processors, one or more indications for output to the restaurant user to verify some or all of the received price data;
based at least in part on the received price data, identifying, by the one or more computer processors, similar items from the two or more restaurant vendors, wherein the identified similar items have mismatched prices per standard unit of measure, further comprising grouping the received price data to a predefined workflow;
converting, by the one or more computer processors, at least two identified similar items to be equivalent items using a conversion ratio based on the received price data, the conversion ratio comprising a price per standard unit of measure associated with the equivalent items, wherein the equivalent items comprise at least a first item of a first type and a second item of a second type, wherein the first type and the second type are different types;
generating, by the one or more computer processors, an output indication of the equivalent items;
creating, by the one or more computer processors, a purchase order using one or more activities associated with the predefined workflow, the activities comprising:
receiving an order request from the restaurant user, the order request comprising a request for the first item of the first type;
comparing, using the conversion ratio, the identified equivalent items to determine a lowest price;
outputting an indication of the lowest price between the first item of the first type and the second item of the second type;
providing an override function for the restaurant user to select a preferred item over the lowest price between the first item of the first type and the second item of the second type;
generating a proposed purchase order with at least one editable field, the proposed purchase order indicating the preferred item;
providing the proposed purchase order for the restaurant user to enter, in the at least one editable field, a quantity for the preferred item; and
after restaurant user approval, generating the purchase order, based at least in part on a purchase order form received from at least one of the two or more restaurant vendors, utilizing the user-selected item and user-entered quantity in the proposed purchase order,
wherein the purchase order has been converted, by the one or more computer processors, into a comma separated value formatted file;
transmitting, by the one or more computer processors, the purchase order to the at least one of the two or more restaurant vendors;
receiving, from the at least one of the two or more restaurant vendors, an invoice for the purchase order, wherein the invoice is automatically stored in the historical price archive;
comparing, by the one or more computer processors, the invoice to the historical price archive to create cross-referenced data;
determining, by the one or more computer processors, if the invoice from the at least one of the two or more restaurant vendors creates a price discrepancy based at least in part on the received pricing data or the cross-referenced data;
based on the determination of the price discrepancy, notifying, by the one or more computer processors, the restaurant user via a discrepancy report to allow the restaurant user to short pay the invoice for the price discrepancy; and
short paying, by the one or more computer processors, the invoice to the at least one of the two or more restaurant vendors.

2. The method of claim 1, wherein the receiving the price data from the two or more restaurant vendors on behalf of the restaurant user comprises:
generating a user request for the price data from each of the two or more restaurant vendors on behalf of the restaurant user for a period of time, wherein the period of time is determined by the two or more restaurant vendors;
transmitting the user request to each of the two or more restaurant vendors via a network;
based at least in part of the user request, receiving by each of the two or more restaurant vendors the user request and transmitting the price data to the restaurant user via the network; and
based at least in part on the user request, importing the price data from each of the two or more restaurant vendors.

3. The method of claim 1, wherein the generating the one or more indications for output to the restaurant user comprises:
outputting a respective visual indication to a display device; and
organizing the respective visual indication on the display device.

4. The method of claim 1, wherein the comparing the similar items from the two or more restaurant vendors to identify the lowest price comprises:

- determining if the similar items are associated with a mismatched price per standard unit of measure;
- based on the determination of the mismatched price per standard unit of measure for at least one of the similar items, converting, using the conversion ratio, at least one of the similar items with the mismatched price per standard unit measure into an equivalent item;
- creating a matching spreadsheet with the similar items and the equivalent item; and
- identifying the lowest price from the matching spreadsheet for the equivalent item utilizing a second price per standard unit of measure.

5. The method of claim 1, further comprising:

receiving new price data;
based at least in part on the new price data, updating at least one of the one or more indications, identifying the similar items, comparing, using the conversion ratio, the similar items to identify the lowest price, converting, using the conversion ratio, mismatched similar items into equivalent items, updating a matching spreadsheet, and generating one or more new purchase orders.

6. The method of claim 1, wherein the transmitting the purchase order to the at least one of the two or more restaurant vendors comprises:

- transmitting the purchase order via a network; and
- indicating to the restaurant user the at least one of the two or more restaurant vendors have received the purchase order.

7. A system comprising:

- at least one memory for storing computer-executable instructions; and
- at least one processor configured to access the memory and further configured to execute the computer-executable instructions operable to:
  - receive and import price data within a comma separated value formatted file from two or more restaurant vendors on behalf of a restaurant user, wherein the price data is automatically stored in an historical price archive;
  - based at least in part on the received price data, generate one or more indications for output to the restaurant user to verify some or all of the received price data;
  - based at least in part on the received price data, identify similar items from the two or more restaurant vendors, wherein the identified similar items have mismatched prices per standard unit of measure, further comprising grouping the received price data to a predefined workflow comprising one or more activities;
  - convert at least two identified similar items to be equivalent items using a conversion ratio based on the received price data, the conversion ratio comprising a price per standard unit of measure associated with the equivalent items, wherein the equivalent items comprise at least a first item of a first type and a second item of a second type, wherein the first type and the second type are different types;
  - generate an output indication of the equivalent items;
  - create a purchase order using one or more activities associated with the predefined workflow, the activities comprising:
    - compare, using the conversion ratio, the equivalent items to determine a lowest price;
    - generate a proposed purchase order with at least one editable field, the proposed purchase order indicating the lowest price between the first item of the first type and the second item of the second type;
    - provide an override function for the restaurant user to select a preferred item over the lowest price between the first item of the first type and the second item of the second type;
    - provide the proposed purchase order for the restaurant user to select, in the at least one editable field, a quantity for the preferred item; and
    - after user approval, generate the purchase order, based at least in part on a purchase order form received from at least one of the two or more restaurant vendors, and utilize the user-selected item and user-entered quantity in the proposed purchase order, wherein the purchase order has been converted into a comma separated value formatted file;
  - transmit the purchase order to the at least one of the two or more restaurant vendors;
  - receive from the at least one of the two or more restaurant vendors, an invoice for the transmitted purchase order, wherein the invoice is automatically stored in the historical price archive;
  - compare the invoice to the historical price archive to create cross-referenced data;
  - determine if the invoice from the at least one of the two or more restaurant vendors creates a price discrepancy based at least in part on the received pricing data or the cross-referenced data;
  - based on the determination of the price discrepancy, notify the restaurant user via a discrepancy report to allow the restaurant user to short pay the invoice for the price discrepancy; and
  - short pay, by the one or more computer processors, the invoice to the at least one of the two or more restaurant vendors.

8. The system of claim 7, wherein the computer-executable instructions operable to receive the price data from the two or more restaurant vendors on behalf of the restaurant user further comprise instructions operable to:

- generate a user request for the price data from each of the two or more restaurant vendors on behalf of the restaurant user for every period of time, wherein the period of time is determined by the two or more restaurant vendors;
- transmit the user request to each of the two or more restaurant vendors via a network;
- based at least in part on the user request, receiving by each of the two or more restaurant vendors the user request and transmitting the price data to the restaurant user via the network; and
- based at least in part of the user request, importing the price data from each of the two or more restaurant vendors.

9. The system of claim 7, wherein the computer-executable instructions operable to generate the one or more indications for output to the restaurant user further comprise instructions operable to:

- output a respective visual indication to a display device; and
- organize the respective visual indication on the display device.

10. The system of claim 7, wherein the computer-executable instructions operable to compare the similar items from the two or more restaurant vendors to identify the lowest price further comprise instructions operable to:
- determine if the similar items are associated with a mismatched price per standard unit of measure;
- based on the determination of the mismatched price per standard unit of measure for at least one of the similar items, converting, using the conversion ratio, the at least one of the similar items with the mismatched price per standard unit measure into an equivalent item;
- create a matching spreadsheet with the identified similar items and the equivalent item; and
- identify the lowest price from the matching spreadsheet for each of the similar items and the equivalent item utilizing a second price per standard unit of measure.

11. The system of claim 7, wherein the computer-executable instructions are further operable to:
- receive new price data;
- based at least in part on the new price data, updating at least one of the one or more indications, identifying the similar items, comparing the similar items to identify the lowest price, converting mismatched similar items into equivalent items, updating a matching spreadsheet, and generating one or more new purchase orders.

12. The system of claim 7, wherein the computer-executable instructions operable to transmit the purchase order to the at least one of the two or more restaurant vendors further comprise instructions operable to:
- transmit the purchase order via a network; and
- indicate to the restaurant user the at least one of the two or more restaurant vendors have received the purchase order.

13. A non-transitory computer-readable media storing computer-executable instructions that, when executed by at least one processor, configure the at least one processor to perform operations comprising:
- receiving and importing price data within a comma separated value formatted file from two or more restaurant vendors on behalf of a restaurant user, wherein the price data is automatically stored in an historical price archive;
- based at least in part on the received price data, generating one or more indications for output to the restaurant user to verify some or all of the received price data;
- based at least in part on the received price data, identifying similar items from the two or more restaurant vendors, wherein the identified similar items have mismatched prices per standard unit of measure, further comprising grouping the received price data to a predefined workflow comprising one or more activities;
- converting at least two identified similar items to be equivalent items using a conversion ratio based on the received price data, the conversion ratio comprising a price per standard unit of measure associated with the equivalent items, wherein the equivalent items comprise at least a first item of a first type and a second item of a second type, wherein the first type and the second type are different types;
- generating an output indication of the equivalent items;
- creating a purchase order using one or more activities associated with the predefined workflow, the activities comprising:
  - comparing, using the conversion ratio, the equivalent items to determine a lowest price;
  - generating a proposed purchase order with at least one editable field, the proposed purchase order indicating the lowest price between the first item of the first type and the second item of the second type;
  - providing an override function for the restaurant user to select a preferred item over the lowest price between the first item of the first type and the second item of the second type;
  - providing the proposed purchase order for the restaurant user to select, in the at least one editable field, a quantity for the preferred item; and
  - after user approval, generating the purchase order, based at least in part on a purchase order form received from at least one of the two or more restaurant vendors, utilizing the user-selected item and user-entered quantity in the proposed purchase order, wherein the purchase order has been converted into a comma separated value formatted file;
- transmitting the purchase order to the at least one of the two or more restaurant vendors;
- receiving from the at least one of the two or more restaurant vendors, an invoice for the transmitted purchase order, wherein the invoice is automatically stored in the historical price archive;
- comparing the invoice to the historical price archive to create cross-referenced data;
- determining if the invoice from the at least one of the two or more restaurant vendors creates a price discrepancy based at least in part on the received pricing data or the cross-referenced data;
- based on the determination of the price discrepancy, notifying the restaurant user via a discrepancy report to allow the restaurant user to short pay the invoice for the price discrepancy; and
- short paying the invoice to the at least one of the two or more restaurant vendors.

14. The non-transitory computer-readable media of claim 13, wherein the receiving the price data from the two or more restaurant vendors on behalf of the restaurant user, the computer-executable instructions further configure the at least one processor to perform operations comprising:
- generating a user request for the price data from each of the two or more restaurant vendors on behalf of the restaurant user for every period of time, wherein the period of time is determined by the two or more restaurant vendors;
- transmitting the user request to each of the two or more restaurant vendors via a network;
- based at least in part on the user request, receiving by each of the two or more restaurant vendors the user request and transmitting the price data to the restaurant user via the network; and
- based at least in part of the user request, importing the price data from each of the two or more restaurant vendors.

15. The non-transitory computer-readable media of claim 13, wherein the generating the one or more indications for output to the restaurant user, the computer-executable instructions further configure the at least one processor to perform operations comprising:
- outputting a respective visual indication to a display device; and
- organizing the respective visual indication on the display device.

16. The non-transitory computer-readable media of claim 13, wherein the comparing the similar items from the two or more restaurant vendors to identify the lowest price, the computer-executable instructions further configure the at least one processor to perform operations comprising:

determining if the similar items are associated with a mismatched price per standard unit of measure;

based on the determination of the mismatched price per standard unit of measure for at least one of the similar items, converting, using the conversion ratio, at least one of the similar items with the mismatched price per standard unit measure into an equivalent item;

creating a matching spreadsheet with the similar items and the equivalent item; and identifying the lowest price from the matching spreadsheet for the equivalent item utilizing a second price per standard unit of measure.

17. The non-transitory computer-readable media of claim 13, wherein the computer-executable instructions further configure the at least one processor to perform operations comprising:

receiving new price data;

based at least in part on the new price data, updating at least one of the one or more indications, identifying the similar items, comparing the similar items to identify the lowest price, converting mismatched similar items into equivalent items, updating a matching spreadsheet, and generating one or more new purchase orders.

* * * * *